US011717811B2

(12) United States Patent
Lambert et al.

(10) Patent No.: US 11,717,811 B2
(45) Date of Patent: *Aug. 8, 2023

(54) MACROPOROUS OXYGEN CARRIER SOLID WITH AN OXIDE CERAMIC MATRIX, METHOD FOR THE PREPARATION THEREOF, AND USE THEREOF FOR A CHEMICAL-LOOPING OXIDATION-REDUCTION METHOD

(71) Applicants: IFP Energies nouvelles, Rueil-Malmaison (FR); TOTAL RAFFINAGE CHIMIE, Courbevoie (FR)

(72) Inventors: Arnold Lambert, Chavanay (FR); Mathieu Michau, Lyons (FR); Delphine Marti, Lyons (FR); Elodie Comte, Saint-Fons (FR)

(73) Assignees: IFP ENERGIES NOUVELLES, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 1024 days.

This patent is subject to a terminal disclaimer.

(21) Appl. No.: 16/471,499

(22) PCT Filed: Dec. 21, 2017

(86) PCT No.: PCT/EP2017/084208
§ 371 (c)(1),
(2) Date: Jun. 19, 2019

(87) PCT Pub. No.: WO2018/115344
PCT Pub. Date: Jun. 28, 2018

(65) Prior Publication Data
US 2019/0388874 A1    Dec. 26, 2019

(30) Foreign Application Priority Data

Dec. 23, 2016   (FR) ..................... 16/63.301

(51) Int. Cl.
| | |
|---|---|
| *B01J 23/72* | (2006.01) |
| *B01J 21/04* | (2006.01) |
| *B01J 21/12* | (2006.01) |
| *B01J 35/10* | (2006.01) |
| *B01J 35/02* | (2006.01) |
| *B01J 37/03* | (2006.01) |
| *B01J 37/08* | (2006.01) |
| *B01J 37/00* | (2006.01) |
| *F23C 10/01* | (2006.01) |
| *F23C 10/04* | (2006.01) |
| *F23C 13/08* | (2006.01) |
| *B01J 37/02* | (2006.01) |

(52) U.S. Cl.
CPC .............. *B01J 23/72* (2013.01); *B01J 21/04* (2013.01); *B01J 21/12* (2013.01); *B01J 35/023* (2013.01); *B01J 35/026* (2013.01); *B01J 35/108* (2013.01); *B01J 35/1038* (2013.01); *B01J 35/1042* (2013.01); *B01J 35/1047* (2013.01); *B01J 35/1076* (2013.01); *B01J 37/0018* (2013.01); *B01J 37/0203* (2013.01); *B01J 37/0207* (2013.01); *B01J 37/0236* (2013.01); *B01J 37/038* (2013.01); *B01J 37/08* (2013.01); *F23C 10/01* (2013.01); *F23C 10/04* (2013.01); *F23C 13/08* (2013.01)

(58) Field of Classification Search
CPC ... B01J 23/72; B01J 21/04; B01J 21/12; B01J 35/023; B01J 35/026; B01J 35/1038; B01J 35/2042; B01J 35/1047; B01J 35/1076; B01J 35/108; B01J 37/0018; B01J 37/0203; B01J 37/0236; B01J 37/038; B01J 37/08; F23C 10/01; F23C 10/04

See application file for complete search history.

(56) References Cited

U.S. PATENT DOCUMENTS

| | | | |
|---|---|---|---|
| 5,447,024 A | 9/1995 | Ishida et al. | |
| 6,888,011 B2 | 5/2005 | Borchert et al. | |
| 11,071,971 B2 * | 7/2021 | Lambert | ................ C01B 32/50 |

(Continued)

FOREIGN PATENT DOCUMENTS

| | | |
|---|---|---|
| EP | 2826557 A1 | 1/2015 |
| FR | 3022160 A1 | 12/2015 |

(Continued)

OTHER PUBLICATIONS

Jeom-ln Baek et al., Fuel, (2015), v.144, p. 317-326.*
Bolhar-Nordenkampf et al., Energy Procedia, (2009), v1, p. 19-25.*
De Diego et al., Energy & Fuels, (2005), 19(5), 1850-1856.*
International Search Report for PCT/EP2017/084208, dated Apr. 10, 2018, and English translation submitted herewith (14 pages).

(Continued)

*Primary Examiner* — Yong L Chu
(74) *Attorney, Agent, or Firm* — Fitch, Even, Tabin & Flannery, L.L.P.

(57) ABSTRACT

The invention relates to an oxygen carrier solid, its preparation and its use in a method of combustion of a hydrocarbon feedstock by active mass chemical-looping oxidation-reduction, i.e. chemical-looping combustion (CLC). The solid, which is in the form of particles, comprises an oxidation-reduction active mass composed of metal oxide(s) dispersed in a ceramic matrix comprising at least one oxide with a melting point higher than 1500° C., such as alumina, and has, initially, a specific macroporous texture. The oxygen carrier solid is prepared from an aqueous suspension containing precursor oxide grains for the ceramic matrix that have a specific size, by a spray-drying technique.

23 Claims, 10 Drawing Sheets

(56) References Cited

U.S. PATENT DOCUMENTS

2017/0120224 A1  5/2017  Boualleg et al.
2018/0154340 A1  6/2018  Boualleg et al.

FOREIGN PATENT DOCUMENTS

| FR | 3022161 A1 | 12/2015 |
|---|---|---|
| WO | 2006/123925 A1 | 11/2006 |
| WO | 2012/155059 A1 | 11/2012 |
| WO | 2013/104836 A1 | 7/2013 |

OTHER PUBLICATIONS

Written Opinion of International Searching Authority for PCT/EP2017/084208.

Jeom-In Baek et al: "Effect of MgO addition on the physical properties and reactivity of the spray-dried oxygen carriers prepared with a high content of NiO and Al2O3", Fuel, vol. 144, Nov. 21, 2014 (Nov. 21, 2014), pp. 317-326, XP055460121, GB ISSN: 0016-2361.

Jeom-In Baek et al: "Performance Comparison of Spray-Dried Oxygen Carriers: The Effect of NiO and Pseudoboehmite Content in Raw Materials", Energy & Fuels., vol. 24, No. 10, Oct. 5, 2010 (Oct. 5, 2010-), pp. 5757-5764, XP055460150, Washington, DC, US. ISSN: 0887-0624.

Quddus Mohammad R et al: "Ni based oxygen carrier over [gamma]-Al2O3 for chemical looping combustion Effect of preparation method on metal support interaction", Catalysis Today, Elsevier, Amsterdam, NL, vol. 210, Mar. 29, 2013 (Mar. 29, 2013), pp. 124-134, XP028561578, ISSN: 0920-5861.

Yu Fu et al: "Effective Macroporous Core-Shell Structure of Alumina-Supported Spinel Ferrite for Carbon Dioxide Splitting Based on Chemical Looping", Energy Technology, vol. 4, No. 11, Jul. 21, 2016 (Jul. 21, 2016), pp. 1349-1357, XP055404110.

Juan Adanez et al: "Progress in Chemical-Looping Combustion and Reforming technologies", Progress in Energy and Combustion Science, vol. 38, No. 2, Nov. 8, 2011 (Nov. 8, 2011), pp. 215-282, XP055022410, ISSN: 0360-1285.

Asep Bayu Dani Nandiyanto et al: "Progress in developing spray-drying methods for the production of controlled morphology particles: From the nanometer to submicrometer size ranges", Advanced Powder Technology, Elsevier BV, NL, vol. 22, No. 1, Sep. 23, 2010 (Sep. 23, 2010), pp. 1-19, XP028147443, ISSN: 0921-8831.

Jerndal et al: "Thermal Analysis of Chemical-Looping Combustion", Chemical Engineering Research and Design, Elsevier, Amsterdam, NL, vol. 84, No. 9, Sep. 1, 2006 (Sep. 1, 2006), pp. 795-806, XP022536199, ISSN: 0263-8762.

Zhao Kun et al: "Three-dimensionally ordered macroporous LaFeO3 perovskites for chemical-looping steam reforming of methane", International Journal of Hydrogen Energy, vol. 39, No. 7, Jan. 4, 2014 (Jan. 4, 2014), pp. 3243-3252, XP028605882, ISSN: 0360-3199.

Yan'E Zheng et al: "Characteristic of macroporous $CeO_2$—$ZrO_2$ oxygen carrier for chemical-looping steam methane reforming", Journal of Rare Earths, vol. 32, No. 9, Sep. 1, 2014 (Sep. 1, 2014), pp. 842-848, XP055404109, CN ISSN: 1002-0721.

Wei et al., "Continuous Operation of a 10 kWth Chemical Looping Integrated Fluidized Bed Reactor for Gasifying Biomass Using an Iron-Based Oxygen Carrier", Energy Fuels 29, 233-241, 2015).

C. R. Forero, P. Gayán, F. García-Labiano, L.F. de Diego, A. Abad, J. Adánez, High Temperature Behaviour of a $CuO/\gamma Al_2O_3$ Oxygen Carrier for Chemical-Looping Combustion, Int. J. Greenhouse Gas Control 5 (2011) 659-667.

Adanez-Rubio et al. "Investigation of Combined Supports for Cu-Based Oxygen Carriers for Chemical-Looping with Oxygen Uncoupling (CLOU)", Energy Fuels 2013 (27), 3918-3927.

Jerndal, E., Mattisson, T., Thijs, I., Snijkers, F. & Lyngfelt, A., "Investigation of NiO/NiAl2O4 oxygen carriers for chemical-looping combustion produced by spray-drying", International Journal of Greenhouse Gas Control, 4, (2010) 23-35.

Linderholm et al., Chemical-looping combustion in a 100-kW unit using a mixture of ilmenite and manganese ore as oxygen carrier, Fuel, 166 (2016), 533-542.

J.C. Abanades, B. Arias, A. Lyngfelt, T. Mattisson, D.E. Wiley, H. Li, M.T. Ho, E. Mangano, S. Brandani, "Emerging CO2 Capture Systems", Int. J. Greenhouse Gas Control 40 (2015), 126-166.

P. Knutsson and C. Linderholm, "Characterization of Ilmenite used as Oxygen Carrier in a 100 kW Chemical-Looping Combustor for Solid Fuels", 3rd International Conference on Chemical Looping, Sep. 9-11, 2014, Gothenburg, Sweden.

L.S. Fan et al., "Chemical-Looping Technology Platform". AIChE J. vol. 61, No. 1, pp. 2-22, (2015).

Linderholm, C., Mattisson, T. & Lyngfelt, A., "Long-term integrity testing of spray-dried particles in a 10-kW chemical-looping combustor using natural gas as fuel". Fuel, 88 (11), (2009) 2083-2096.

* cited by examiner (a)

(b)

MACROPOROUS OXYGEN CARRIER SOLID WITH AN OXIDE CERAMIC MATRIX, METHOD FOR THE PREPARATION THEREOF, AND USE THEREOF FOR A CHEMICAL-LOOPING OXIDATION-REDUCTION METHOD

CROSS-REFERENCE TO RELATED APPLICATIONS

This application is a U.S. national phase application filed under 35 U.S.C. § 371 of International Application No. PCT/EP2017/084208, filed Dec. 21, 2017, designating the United States, which claims priority from French Patent Application No.: 16/63,301, filed Dec. 23, 2016, the entire content of each of which are hereby incorporated herein by reference.

FIELD OF THE INVENTION

The present invention relates to an oxygen carrier solid, the preparation thereof and the use thereof in what is commonly called a chemical looping redox process on an active mass. In particular, the new type of oxygen carrier solid according to the invention possibly being used in what is commonly called a chemical looping combustion process.

General Context

Chemical looping redox processes on an active mass are known in the field of energy production, gas turbines, boilers and furnaces, especially for the oil, glass and cement industry.

In particular, the production of electricity, heat, hydrogen or steam can be achieved by processes of this type, typically the CLC process, using redox reactions of an active mass, referred to as a redox mass, conventionally a metal oxide, to produce a hot gas from a fuel, for example natural gas, carbon monoxide CO, hydrogen $H_2$, coals or petroleum residues, a mixture of hydrocarbons, and to isolate the carbon dioxide $CO_2$ produced. It is then conceivable to store the captured $CO_2$ in geological formations, or to use it as a reagent in other processes, or else to inject it into oil wells in order to increase the amount of hydrocarbons extracted from the deposits (enhanced oil recovery (EOR) and enhanced gas recovery (EGR)).

In such a chemical looping redox process on an active mass, a first reaction of oxidation of the active mass with air or another oxidizing gas, acting as oxidizer, makes it possible, because of the exothermic nature of the oxidation, to obtain a hot gas, the energy of which can then be exploited. When the oxidizing gas is water vapor, the oxidation of the active mass also makes it possible to produce an $H_2$-rich gaseous effluent.

A second reaction of reduction of the oxidized active mass with the aid of a reducing gas, liquid or solid (hydrocarbon feedstock) then makes it possible to obtain a reusable active mass and also a gas mixture comprising essentially $CO_2$ and water, or even synthesis gas containing CO and $H_2$, depending on the conditions brought about during the reduction step.

In a CLC process, the energy can be produced in the form of steam or electricity for example. The heat of combustion of the hydrocarbon feedstock is similar to that encountered in conventional combustion. This corresponds to the sum of the heats of reduction and of oxidation in the chemical loop. The heat is generally extracted by exchangers located inside, in the wall or appended to the fuel and/or air reactors, on the flue gas lines, or on the active mass transfer lines.

A major advantage of these chemical looping redox processes on an active mass is then to make it possible to easily isolate the $CO_2$ (or the synthesis gas) contained in the oxygen-free and nitrogen-free gas mixture constituting the effluent from the reduction reactor. Another advantage consists of the production of a stream of nitrogen $N_2$ (and argon) containing almost no oxygen any more, and corresponding to the effluent from the oxidation reactor, when air is used as oxidizing gas.

In a context of increasing global energy demand, the CLC process therefore provides an attractive solution for capturing $CO_2$ with a view to the sequestration thereof or reuse thereof for other processes, in order to limit the emission of environmentally harmful greenhouse gases.

U.S. Pat. No. 5,447,024 describes for example a CLC process comprising a first reactor for reducing an active mass using a reducing gas and a second, oxidation reactor for restoring the active mass to its oxidized state by an oxidation reaction with moist air. The circulating fluidized-bed technology is used to allow the continuous passage of the active mass from the reduction reactor to the oxidation reactor and vice versa.

Patent application WO 2006/123925 describes another implementation of the CLC process using one or more fixed-bed reactors containing the active mass, the redox cycles being carried out by switching the gases in order to successfully carry out the reactions of oxidation and reduction of the active mass.

The active mass, passing alternately from its oxidized form to its reduced form and vice versa, follows a redox cycle.

It should be noted that, in general, the terms oxidation and reduction are used in relation to the respectively oxidized or reduced state of the active mass. The oxidation reactor is the one in which the active mass is oxidized and the reduction reactor is the reactor in which the active mass is reduced.

Thus, in the reduction reactor, the active mass, generally a metal oxide ($M_xO_y$), is firstly reduced to the $M_xO_{y-2n-m/2}$ state, by means of a $C_nH_m$ hydrocarbon, which is correlatively oxidized to $CO_2$ and $H_2O$, according to reaction (1), or optionally to a $CO+H_2$ mixture depending on the nature of the active mass and the proportions used.

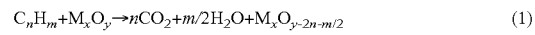
$$C_nH_m + M_xO_y \rightarrow nCO_2 + m/2 H_2O + M_xO_{y-2n-m/2} \quad (1)$$

In the oxidation reactor, the active mass is restored to its oxidized state ($M_xO_y$) in contact with air according to reaction (2), before returning to the first reactor.

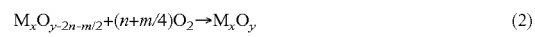
$$M_xO_{y-2n-m/2} + (n+m/4)O_2 \rightarrow M_xO_y \quad (2)$$

In the case where the oxidation of the active mass is carried out by water vapor, a stream of hydrogen is obtained at the outlet of the oxidation reactor (reaction (3)).

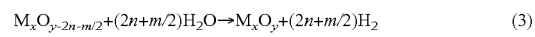
$$M_xO_{y-2n-m/2} + (2n+m/2)H_2O \rightarrow M_xO_y + (2n+m/2)H_2 \quad (3)$$

In the equations above, M represents a metal.

The active mass acts an an oxygen carrier in the chemical looping redox process. Thus the solid comprising the active mass, typically comprising the metal oxide(s) capable of exchanging oxygen under the redox conditions of the chemical looping redox process, is commonly denoted as the oxygen carrier solid.

The oxygen carrier solid may further comprise a binder or a support in combination with the active mass, in particular to ensure good reversibility of the oxidation and reduction reactions, and to improve the mechanical strength of the particles. Specifically, the active masses, chosen for example from copper, nickel, iron, manganese and/or cobalt redox couples, are generally not used in pure form since the successive oxidation/reduction cycles at high temperature lead to a significant and rapid reduction in the oxygen transfer capacity, due to the sintering of the particles.

Thus, in patent U.S. Pat. No. 5,447,024, the oxygen carrier solid comprises a NiO/Ni redox couple as active mass, combined with a YSZ binder which is yttrium-stabilized zirconia, also referred to as yttria zirconia.

Many types of binders and supports, in addition to yttria zirconia YSZ, have been studied in the literature in order to increase the mechanical strength of particles at a lower cost than YSZ. Among these, mention may be made of alumina, metal aluminate spinels, titanium dioxide, silica, zirconia, ceria, kaolin, bentonite, etc.

The effectiveness of the chemical looping redox process depends mainly on the physicochemical properties of the oxygen carrier solid. In addition to the reactivity of the active mass involved and the oxygen transfer capacity of the oxygen carrier solid (active mass+binder/support), which have an influence on the sizing of the reactors and, in the case of circulating fluidized-bed technology, on the particle circulation rates, the lifetime of the particles in the process has a preponderant impact on the operating cost of the process, particularly in the case of the circulating fluidized-bed process.

Specifically, in the case of the circulating fluidized-bed process, the rate of attrition of the particles makes it necessary to compensate for the loss of oxygen carrier solid in the form of fines, typically particles of the oxygen carrier solid with a diameter of less than 40 µm, with fresh oxygen carrier solid. The rate of replacement of the oxygen carrier solid therefore depends greatly on the mechanical strength of the particles and also on their chemical stability under the process conditions, which includes many successive oxidation/reduction cycles.

In general, the performance of oxygen carrier solids reported in the literature is satisfactory in terms of oxygen transfer capacity and reactivity with the various hydrocarbons tested (Adanez, J., Abad, A., Garcia-Labiano, F., Gayan, P. & de Diego, L. F., "Progress in Chemical Looping Combustion and Reforming Technologies", Progress in Energy and Combustion Science, 38(2), (2012) 215-282). However, in most publications, too short a test period and/or the lack of thorough characterization of the particles after the test do not make it possible to conclude as to the lifetime of the particles in the CLC process, although some authors announce significant lifetimes.

Some recent studies highlight the problem of the lifetime of particles related to the many redox cycles undergone by the particles in the CLC process.

For example, the problem of the lifetime of ilmenite particles ($FeTiO_3$ ore) has recently been highlighted by P. Knutsson and C. Linderholm ("Characterization of Ilmenite used as Oxygen Carrier in a 100 kW Chemical-Looping Combustor for Solid Fuels", 3rd International Conference on Chemical Looping, Sep. 9-11, 2014, Gothenburg, Sweden). After a long-term test in a 100 kWth circulating fluidized-bed pilot plant, SEM characterization of the aged particles shows that a high porosity has developed within the particles, which results in the disintegration thereof in the form of fines which are eliminated in gas/solid separation cyclones. The porosity of the ilmenite ore particles increases greatly with the redox cycles and results in the pulverization thereof, potentially calling into question the suitability of this ore for the process, even though the initial studies on the use of ilmenite concluded that it was very suitable for the CLC process. The increase in porosity observed by the detailed characterization of the particles after the test is concomitant with the migration of ferrous and/or ferric ions by diffusion within the particles. According to the authors, segregation of the iron within the particles precedes its migration to the surface, creating the porosity that results in the disintegration of the particles in the form of fines. The appearance of porosity is the main mechanism for the formation of fine particles during the process, considerably limiting the lifetime of the particles, and therefore the potential value of the ore for the CLC application. Specifically, the estimated lifetime of the ilmenite particles is of the order of only 200 hours ("Emerging $CO_2$ Capture Systems", J. C. Abanades, B. Arias, A. Lyngfelt, T. Mattisson, D. E. Wiley, H. Li, M. T. Ho, E. Mangano, S. Brandani, Int. J. Greenhouse Gas Control 40 (2015), 126). The phenomenon of attrition of the oxygen carrier solid is thus mainly due to a morphological evolution linked to the consecutive redox cycles undergone by the particles rather than to impacts on the walls and between particles, customarily considered as the main source of attrition in fluidized-bed processes.

Wei et al. ("Continuous Operation of a 10 kWth Chemical Looping Integrated Fluidized Bed Reactor for Gasifying Biomass Using an Iron-Based Oxygen Carrier". Energy Fuels 29, 233, 2015) also mention the conversion of synthetic particles of Fe $Fe_2O_3/Al_2O_3$ (70/30) into small grains (i.e. pulverization of the particles into fines) after only 60 h of combustion in a circulating fluidized bed.

L. S. Fan et al. ("Chemical-Looping Technology Platform". AIChE J. 61, 2, 2015) state that the lack of demonstration of the CLC process on an industrial scale is related to the unsuitability of the oxygen carrier solids in terms of reactivity, recyclability, oxygen transfer capacity, mechanical strength and attrition resistance. According to these authors, the initial studies on the oxygen carrier solids did not realize the importance of the cationic and anionic migration mechanisms within the particles, which lead to phase segregations, the appearance of cavities or micropores, agglomeration, sintering, etc.

Patent application WO 2012/155059 discloses the use of oxygen carrier solids consisting of an active mass (20 to 70% by weight), of a primary support material of ceramic or clay type (5 to 70% by weight), and of a secondary support material (1 to 35% by weight), also of ceramic or clay type. An improved mechanical stability related to the control of the volume expansion is put forward for these oxygen carrier solids. It is explained that a diffusion movement of the iron ions toward the outside of the particles causes the volume expansion of the particles, which leads to embrittlement of the particles. In the solid according to WO 2012/155059, the primary support material would make it possible to disperse the metallic active mass and prevent its agglomeration, preserving the redox activity, whereas the secondary support material would help to reduce the rate of volume expansion by forming a stabilizing solid phase that would prevent the migration of the iron toward the surface.

Numerous studies relating to a metal oxide (active mass generally based on an oxide of Cu, Ni, Co, Fe and/or Mn) on a support conclude that most of the formulations tested are suitable for the CLC process.

However, Forero et al. (C. R. Forero, P. Gayan, F. Garcia-Labiano, L. F. de Diego, A. Abad, J. Adanez, Int. J. Greenhouse Gas Control 5 (2011) 659-667) report a significant loss of copper oxide, probably attributable to the migration of the active phase toward the outside of the particles during the redox cycles. The copper at the surface is then removed in the fines by attrition. In addition, the porosity of the $CuO/Al_2O_3$ particles increases with the number of cycles, and the aluminous matrix gradually cracks, resulting in the formation of fine particles. Adanez-Rubio et al. (Energy Fuels 2013 (27) 3918) thus report that the tapped packed density of batches of particles based on CuO impregnated on various supports ($TiO_2$, $SiO_2$, $MgAl_2O_4$) decreases significantly, which can be attributed to a significant increase in the porosity of the particles and means that the lifetime of these particles is limited.

The migration of the metal with the number of cycles is also encountered with $Fe_2O_3/Al_2O_3$ particles, as reported by L. S. Fan et al. ("Ionic diffusion in the oxidation of iron—effect of support and its implications to chemical looping applications". Energy Environ. Sci., 4, 876, 2011).

Lyngfelt et al. performed a 1000 h test with nickel-based particles (40% NiO/60% $NiAl_2O_4$) in a circulating fluidized-bed plant with a power of 10 kWth (Linderholm, C., Mattisson, T. & Lyngfelt, A., "Long-term integrity testing of spray-dried particles in a 10-kW chemical-looping combustor using natural gas as fuel", Fuel, 88(11), (2009) 2083-2096). The authors conclude that the lifetime of the particles is of the order of 33,000 h, but a fairly high proportion of agglomerates is observed at the end of the test and part of the solid adhered to the walls of the reactor. The presence of nickel metal on the surface of the particles, due to the migration of nickel to the outside, is probably responsible for the formation of the agglomerates observed (Jerndal, E., Mattisson, T., Thijs, I., Snijkers, F. & Lyngfelt, A., "Investigation of $NiO/NiAl_2O_4$ oxygen carriers for chemical-looping combustion produced by spray-drying", International Journal of Greenhouse Gas Control, 4, (2010) 23). Such agglomerates represent a significant risk of accidental shutdown of the CLC process. In addition, the characterization of the aged particles is insufficient to really conclude the advantage of this solid for CLC. Batch fluidized-bed tests on particles of a similar carrier, carried out by the applicants, show a large migration of nickel toward the periphery of the particles and the formation of fine particles (0.1 to 5 µm in size) consisting essentially of nickel on the surface of large particles. The particles tested are initially purely mesoporous.

The search for a high-performance oxygen carrier solid, in terms of oxygen transfer capacity, reactivity with the various hydrocarbon feedstocks capable of being treated, and mechanical strength, therefore remains a primary objective for the development of chemical looping redox processes, such as CLC.

OBJECTIVES AND SUMMARY OF THE INVENTION

The present invention aims to overcome the problems of the prior art disclosed above, and generally aims to provide an oxygen carrier solid for a chemical looping redox process which has a long lifetime during the use thereof in the process, in particular in order to reduce the investment costs and/or operating costs for such processes.

Thus, to achieve at least one of the aforementioned objectives, among others, the present invention proposes, according to a first aspect, an oxygen carrier solid in the form of particles for a process for chemical looping redox combustion of a hydrocarbon feedstock, comprising:

a redox active mass constituting between 5% and 75% by weight of said oxygen carrier solid, said redox active mass comprising a metal oxide or a mixture of metal oxides and being capable of transporting oxygen in the chemical looping redox combustion process;

a ceramic matrix within which said redox active mass is dispersed, said ceramic matrix constituting between 25% and 95% by weight of said oxygen carrier solid, and said ceramic matrix comprising 100% by weight of at least one oxide having a melting point above 1500° C.;

a porosity such that:

the total pore volume of the oxygen carrier solid, measured by mercury porosimetry, is between 0.05 and 1.2 ml/g, the pore volume of the macropores constitutes at least 10% of the total pore volume of the oxygen carrier solid;

the size distribution of the macropores within the oxygen carrier solid, measured by mercury porosimetry, is between 50 nm and 7 µm.

Preferably, the total pore volume of the oxygen carrier solid is between 0.1 and 0.85 ml/g.

The pore volume of the macropores advantageously constitutes at least 10% of the total pore volume of the oxygen carrier solid.

Preferably, the size distribution of the macropores within the oxygen carrier solid is between 50 nm and 3 µm.

Preferably, the redox active mass comprises at least one metal oxide included in the list consisting of the oxides of Fe, Cu, Ni, Mn and Co, a perovskite having redox properties, preferably a perovskite of formula $CaMnO_3$, a metal aluminate spinel having redox properties, preferably a metal aluminate spinel of formula $CuAl_2O_4$ or a cuprospinel of formula $CuFe_2O_4$.

According to one embodiment of the invention, the redox active mass comprises at least one copper oxide.

Advantageously, said at least one oxide of the ceramic matrix has a melting point above 1700° C. and preferably above 2000° C.

Said at least one oxide of the ceramic matrix may be selected from the list consisting of calcium aluminate of formula $CaAl_2O_4$, silica of formula $SiO_2$, titanium dioxide of formula $TiO_2$, perovskite of formula $CaTiO_3$, alumina of formula $Al_2O_3$, zirconia of formula $ZrO_2$, yttrium dioxide of formula $Y_2O_3$, barium zirconate of formula $BaZrO_3$, magnesium aluminate of formula $MgAl_2O_4$ and magnesium silicate of formula $MgSi_2O_4$ and lanthanum oxide of formula $La_2O_3$.

Advantageously, said at least one oxide of the ceramic matrix is silica, alumina, or a mixture of alumina and silica, and preferably is alumina.

Preferably, the particles have a particle size such that more than 90% of the particles have a size between 50 µm and 600 µm.

According to a second aspect, the invention relates to a process for preparing an oxygen carrier solid according to the invention, comprising the following steps:

(A) preparing an aqueous suspension comprising an oxide or a mixture of oxides that is/are precursor(s) of the ceramic matrix having a melting point above 1500° C., preferably above 1700° C., and even more preferentially above 2000° C., said precursor oxide(s) forming grains having a size between 0.1 µm and 20 µm, preferably between 0.5 µm and 5 µm, and more preferentially between 1 µm and 3 µm;

(B) spray drying said suspension obtained in step (A) in order to form particles, said spray drying comprising spraying the suspension in a drying chamber using spraying means in order to form droplets, and simultaneously bringing said droplets into contact with a hot carrier gas, preferably air or nitrogen, brought to a temperature between 200° C. and 350° C.;

(C) calcining the particles from the spray drying in step (B), said calcining being carried out in air and at a temperature between 400° C. and 1400° C.;

(D) optional screening of the calcined particles from step (C), by separation using a cyclone;

(E) integrating a redox active mass according to a step e1) or a step e2) in order to produce the oxygen carrier solid in the form of particles:

e1) (i) impregnating the particles from step (C) with a precursor compound of a redox active mass, then (ii) drying the impregnated particles followed (iii) by a calcination;

e2) incorporating the redox active mass during the preparation of the suspension in step (A).

According to One Embodiment, Step e1) Comprises:

(i) impregnating the particles from step (C) with an aqueous or organic solution containing at least one soluble precursor compound of copper, nickel, cobalt, iron or manganese, preferably with an aqueous solution containing at least one precursor compound of the redox active mass selected from the list consisting of nitrates of the following formulae: $Cu(NO_3)_2 \cdot xH_2O$, $Ni(NO_3)_2 \cdot xH_2O$, $Co(NO_3)_2 \cdot xH_2O$, $Fe(NO_3)_3 \cdot xH_2O$, $Mn(NO_3)_2 \cdot xH_2O$.

Preferably, the impregnation (i) in step e1) is carried out in one or more successive steps, and preferably comprises intermediate steps of drying at a temperature between 30° C. and 200° C. and/or of calcining at a temperature between 200° C. and 600° C. when the impregnation is performed in several successive steps.

According to one embodiment, the drying (ii) in step e1) is carried out in air or in a controlled atmosphere, at a temperature between 30° C. and 200° C., and preferentially in air at a temperature between 100° C. and 150° C.

According to one embodiment, the calcining (iii) in step e1) is carried out in air at a calcining temperature between 450° C. and 1400° C., preferably between 600° C. and 1000° C., more preferentially between 700° C. and 900° C., and is carried out for a period of 1 to 24 hours, and preferably for a period of 5 to 15 hours.

According to one embodiment, step e2) comprises (j) impregnating the grains of the or said oxide(s) that is (are) precursor(s) of the ceramic matrix with an aqueous or organic solution containing at least one soluble precursor compound of copper, nickel, cobalt, iron or manganese, preferably with an aqueous solution containing at least one precursor compound of the redox active mass selected from the list consisting of nitrates of the following formulae: $Cu(NO_3)_2 \cdot xH_2O$, $Ni(NO_3)_2 \cdot xH_2O$, $Co(NO_3)_2 \cdot xH_2O$, $Fe(NO_3)_3 \cdot xH_2O$, $Mn(NO_3)_2 \cdot xH_2O$, said impregnation being carried out before said grains are suspended.

Alternatively, step e2) may comprise (jj) adding at least one precursor of the redox active mass, said precursor being a soluble compound of copper, nickel, cobalt, iron and/or manganese, to the suspension prepared in step (A), and preferably a precursor compound of the redox active mass selected from the list consisting of nitrates of the following formulae: $Cu(NO_3)_2 \cdot xH_2O$, $Ni(NO_3)_2 \cdot xH_2O$, $Co(NO_3)_2 \cdot xH_2O$, $Fe(NO_3)_3 \cdot xH_2O$, $Mn(NO_3)_2 \cdot xH_2O$.

Alternatively, step e2) may comprise (jjj) adding, to the suspension prepared in step (A), grains of at least one metal oxide included in the list formed by the oxides of Fe, Cu, Ni, Mn and Co, a perovskite that has redox properties, preferably a perovskite of formula $CaMnO_3$, a metal aluminate spinel that has redox properties, preferably a metal aluminate spinel of formula $CuAl_2O_4$ or of formula $CuFe_2O_4$, said grains having a size between 0.1 µm and 20 µm, preferably between 0.5 µm and 5 µm, and more preferentially between 1 µm and 3 µm, in order to form the redox active mass of the oxygen carrier solid.

According to one embodiment, in step A), at least one binder is added to the aqueous suspension, which binder is intended to strengthen the cohesion of the particles obtained at the end of step (B), and/or to control rheology of said aqueous suspension, said binder being an organic binder, preferably selected from the list consisting of polyethylene glycol, polyvinyl alcohol, polyacrylate and polyvinylpyrrolidone, or an inorganic binder, preferably selected from the list consisting of aluminum hydroxides, boehmite, diaspore, tetraethylorthosilicate, silicic acid, aluminosilicates and kaolin-type clays.

According to one embodiment, in step A), at least one pore-forming agent is added to the aqueous suspension, which pore-forming agent is intended to increase the macroporosity of the particles of the oxygen carrier solid.

According to one embodiment, fines of the oxygen carrier solid that are produced during the use of said oxygen carrier solid in a process for chemical looping redox combustion of a hydrocarbon feedstock are recycled to step E).

According to a third aspect, the invention relates to a process for chemical looping redox combustion of a hydrocarbon feedstock using an oxygen carrier solid according to the invention or prepared according to the preparation process according to the invention.

Advantageously, the invention relates to a CLC process, preferably wherein the oxygen carrier solid circulates between at least one reduction zone and an oxidation zone both operating in a fluidized bed, the temperature in the reduction zone and in the oxidation zone being between 400° C. and 1400° C., preferably between 600° C. and 1100° C., and more preferentially between 800° C. and 1100° C.

Other subject-matters and advantages of the invention will become apparent on reading the description which follows of specific exemplary embodiments of the invention, given by way of nonlimiting examples, the description being made with reference to the appended figures described below.

BRIEF DESCRIPTION OF THE FIGURES

FIG. 1A is a graph giving information on the porosity of the oxygen carrier solid. FIG. 1B is a graph representing the conversion of methane as a function of the redox cycles in a CLC process using the oxygen carrier solid. FIG. 1C is a graph representing the particle size distribution of the oxygen carrier solid before and after the use thereof in a CLC process. FIG. 1D is a scanning electron microscopy (SEM) image of a polished section of a sample of the oxygen carrier solid after the use thereof in a CLC process.

FIG. 2A is a graph giving information on the porosity of the oxygen carrier solid. FIG. 2B is a graph representing the conversion of methane as a function of the redox cycles in a CLC process using the oxygen carrier solid. FIG. 2C represents in (a) a SEM image and in (b) an energy dispersive X-ray spectrometry (EDX) mapping of the oxygen carrier solid prior to the use thereof in a CLC process. FIG. 2D is a SEM image of a polished section of a sample of the oxygen carrier solid after the use thereof in a CLC process.

FIG. 3A is a graph giving information on the porosity of the oxygen carrier solid before use in a CLC process. FIG. 3B is a SEM backscattered electron image on a polished section of the solid oxygen carrier prior to the use thereof in a CLC process. FIG. 3C is a graph representing the conversion of methane as a function of the redox cycles in a CLC process using the oxygen carrier solid. FIG. 3D is a graph giving information on the porosity of the oxygen carrier solid after use in a CLC process. FIG. 3E represents in (a) and (b) two SEM images of a polished section of a sample of the oxygen carrier solid after the use thereof in a CLC process.

FIG. 4A is a graph giving information on the porosity of the oxygen carrier solid before use in a CLC process. FIG. 4B is a SEM backscattered electron image on a polished section of the solid oxygen carrier prior to the use thereof in a CLC process. FIG. 4C is a graph representing the conversion of methane as a function of the redox cycles in a CLC process using the oxygen carrier solid. FIG. 4D is a graph giving information on the porosity of the oxygen carrier solid after use in a CLC process. FIG. 4E represents a SEM backscattered electron image of a polished section of a sample of the solid oxygen carrier after the use thereof in a CLC process.

DESCRIPTION OF THE INVENTION

Figure 1A:
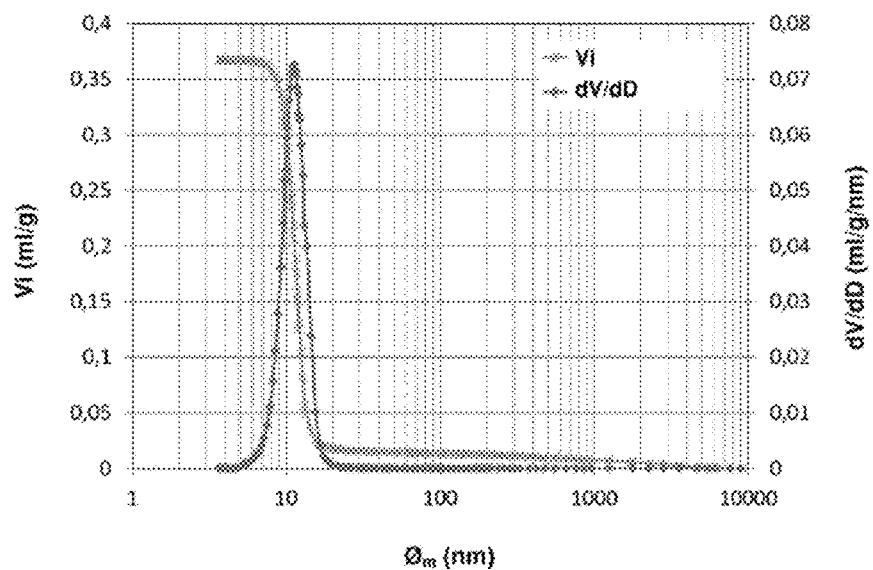
FIGS. 1A, 1B, 1C and 1D relate to an oxygen carrier solid according to example 2 (example not in accordance with the invention).

The objective of the invention is to provide an oxygen carrier solid for a chemical looping redox process, such as a CLC process, but also for other chemical looping redox processes on an active mass such as a chemical looping reforming (CLR) process or a CLOU (chemical looping oxygen uncoupling) process.

The present invention also relates to the preparation and use of the oxygen carrier solid in such processes.

CLC processes generally require two separate reactors in order to carry out firstly, in a reduction reactor, the reduction of the active mass by means of a fuel, or more generally a reducing gas, liquid or solid. The effluents from the reduction reactor mainly contain $CO_2$ and water, allowing easy capture of the $CO_2$. Secondly, in the oxidation reactor, restoring the active mass to its oxidized state by contact with air or any other oxidizing gas makes it possible to correlatively generate an energy-carrying hot effluent and a lean nitrogen stream or a nitrogen-free stream (where air is used).

In the present description, reference is above all made to the use of the oxygen carrier solid in a circulating fluidized-bed CLC process, but the oxygen carrier solid according to the invention may also be used in any other type of chemical looping (CLC, CLR, CLOU) redox process in a fixed, moving or ebullated bed, or else in a rotating reactor.

The Oxygen Carrier Solid

The Oxygen Carrier Comprises:

a redox active mass constituting between 5% and 75% by weight of the oxygen carrier solid, preferably between 10% and 40% by weight, the redox active mass comprising a metal oxide or a mixture of metal oxides and being capable of exchanging oxygen under the redox conditions of said chemical looping redox process;

a ceramic matrix within which the redox active mass is dispersed, the ceramic matrix constituting between 25% and 95% by weight of the oxygen carrier solid, preferably between 60% and 90% by weight, and the ceramic matrix comprising 100% by weight of at least one oxide having a melting point above 1500° C., and preferably having a melting point above 1700° C., and even more preferentially having a melting point above 2000° C.

A ceramic matrix comprising 100% by weight of at least one oxide is understood to mean that the matrix consists essentially of this oxide (or mixture of oxides), to within 1% by weight.

In addition to a ceramic matrix comprising at least one oxide having a melting point above 1500° C., and preferably a melting point above 1700° C., even more preferentially a melting point above 2000° C., the oxygen carrier solid according to the invention has a particular porosity which, unexpectedly, makes it possible to limit the migration phenomenon of the active mass within the oxygen carrier particles. This initial texture significantly improves the lifetime of the particles in the chemical looping combustion process and is characterized in that:

the total pore volume of the oxygen carrier solid Vtot, measured by mercury porosimetry, is between 0.05 and 1.2 ml/g;

the total pore volume Vtot of the oxygen carrier solid comprises at least 10% of macropores. In other words, the pore volume of the macropores constitutes at least 10% of the total pore volume Vtot of the oxygen carrier solid;

the size distribution of the macropores within the oxygen carrier solid, measured by mercury porosimetry, is between 50 nm and 7 μm.

It is recalled that according to the IUPAC nomenclature, micropores refer to pores whose size is less than 2 nm, mesopores refer to pores whose size is between 2 and 50 nm, and macropores refer to pores having a size greater than 50 nm.

The "initial texture" is understood to mean the texture before any use in a chemical looping redox process such as CLC.

The total pore volume of the solid is measured by mercury porosimetry, more specifically the measurement relates to the volume of mercury injected when the pressure exerted increases from 0.22 MPa to 413 MPa.

The total pore volume Vtot of the oxygen carrier solid is preferably between 0.1 and 0.85 ml/g.

Preferably, the total pore volume Vtot of the particles is constituted, for at least 40%, by macropores. In other words, the pore volume of the macropores constitutes at least 40% of the total pore volume Vtot of the oxygen carrier solid. The remainder of the total pore volume may either consist of microporosity or mesoporosity in any proportion whatsoever.

The size distribution of the macropores within the particles, measured by mercury porosimetry, is more preferentially between 50 nm and 3 μm, and even more preferably between 200 nm and 1 μm.

The reason(s) why this initial macroporous texture of the oxygen carrier solid minimizes the migration of the active mass within the particles is not yet explained. Without being bound to a particular theory, the inventors attribute this phenomenon, at least partially, to the fact that the diffusion limitations, usually reported for the mesoporous particles according to the prior art, are largely minimized because of the particularly open texture of the particles according to the invention. The gases can easily access the active mass dispersed within the ceramic matrix, limiting the mobility of the active mass due to concentration gradients, particularly during the oxidation of the particles. Indeed it is known that metal cations generally migrate through the primary oxide layer formed during the oxidation of a reduced metal particle (S. Mrowec, Z. Grzesik, "Oxidation of nickel and transport properties of nickel oxide", J. Phys. Chem. Solids, 64, 1651, 2004), since the diffusion rate of the metal cations in the oxide layer is higher than that of the oxygen anion ($O^{2-}$).

The Ceramic Matrix

The ceramic matrix consists essentially of at least one oxide, or a mixture of oxides, having a melting point above 1500° C., preferably above 1700° C., and more preferentially above 2000° C., which is preferably selected from the list consisting of calcium aluminate $CaAl_2O_4$, silica $SiO_2$, titanium dioxide $TiO_2$, perovskite $CaTiO_3$, alumina $Al_2O_3$, zirconia $ZrO_2$, yttrium dioxide $Y_2O_3$, barium zirconate $BaZrO_3$, magnesium aluminate $MgAl_2O_4$, magnesium silicate $MgSi_2O_4$ and lanthanum oxide $La_2O_3$.

Calcium aluminate $CaAl_2O_4$ has a melting point above 1500° C., silica $SiO_2$, titanium dioxide $TiO_2$ and perovskite $CaTiO_3$ have a melting point above 1700° C., and alumina $Al_2O_3$, zirconia $ZrO_2$, yttrium dioxide $Y_2O_3$, barium zirconate $BaZrO_3$, magnesium aluminate $MgAl_2O_4$, magnesium silicate $MgSi_2O_4$ and lanthanum oxide $La_2O_3$ have a melting point above 2000° C.

Preferably, said oxide of the ceramic matrix is silica, alumina, or a mixture of alumina and silica.

In the present description the term oxide covers a mixed oxide, i.e. a solid resulting from the combination of $O^{2-}$ oxide ions with at least two cationic elements (for example calcium aluminate $CaAl_2O_4$ or magnesium aluminate $MgAl_2O_4$). A mixture of oxides is understood to mean at least two different solid compounds each being an oxide.

Since the oxide(s) of the ceramic matrix have a high melting point, above 1500° C., their use is advantageous in the context of chemical looping redox processes such as CLC where the temperature reached by the particles of the oxygen carrier is higher than that of the fluidizing gas, sometimes up to 120° C. (Guo, X. Y.; Sun, Y. L.; Li, R.; Yang, F. "Experimental investigations on temperature variation and inhomogeneity in a packed bed CLC reactor of large particles and low aspect ratio", Chem. Eng. Sci. 107, 266, 2014). The higher the melting point of the oxide or mixture of oxides forming the ceramic matrix, the more resistant said ceramic matrix is to sintering. Indeed, Iüttig ($T_H$) and Tammann ($T_T$) temperatures, considered as indicative of the temperature starting from which the sintering of a phase may take place, are directly proportional to the melting point. They are expressed by the semiempirical equations $T_H=0.3 \times T_m$ and $T_T=0.5 \times T_m$ (in Kelvin). When $T_H$ is reached, the atoms become mobile at the surface, and when $T_T$ is reached, the crystal lattices begin to be able to move (A. Cao, R. Lu, G. Veser, Stabilizing metal nanoparticles for heterogeneous catalysis, PHYSICAL CHEMISTRY CHEMICAL PHYSICS 12 13499-13510, 2010).

Table 1 below lists examples of oxides that may make up the ceramic matrix of the oxygen carrier solid, and indicates their melting point "$T_m$", Hüttig ($T_H$) and Tammann ($T_T$) temperatures.

TABLE 1

| Formula | $T_m$ (° C.) | $T_H$ (° C.) | $T_T$ (° C.) |
|---|---|---|---|
| $CaAl_2O_4$ | 1605 | 290 | 666 |
| $SiO_2$ | 1713 | 323 | 720 |
| $Ta_2O_5$ | 1785 | 344 | 756 |
| $TiO_2$ | 1843 | 362 | 785 |
| $Mg_2SiO_4$ | 1898 | 378 | 813 |
| $CaTiO_3$ | 1980 | 403 | 854 |
| $Al_2O_3$ | 2072 | 431 | 900 |
| $SrTiO_2$ | 2080 | 433 | 904 |

TABLE 1-continued

| Formula | $T_m$ (° C.) | $T_H$ (° C.) | $T_T$ (° C.) |
|---|---|---|---|
| $MgAl_2O_4$ | 2135 | 449 | 931 |
| $Ce_2O_3$ | 2230 | 478 | 979 |
| $La_2O_3$ | 2305 | 500 | 1016 |
| $CeO_2$ | 2400 | 529 | 1064 |
| $Y_2O_3$ | 2425 | 536 | 1076 |
| $Sc_2O_3$ | 2485 | 554 | 1106 |
| $BaZrO_3$ | 2500 | 559 | 1114 |
| $ZrO_2$ | 2715 | 623 | 1221 |

According to the invention, the ceramic matrix may be obtained from the treatment of solid particles obtained by a technique of spray drying an aqueous suspension of oxide(s) of specific size.

The oxygen carrier solid is obtained by integrating the redox active mass into the ceramic matrix, either starting from the step of forming the aqueous suspension of precursor oxide(s) of the ceramic or subsequently by impregnation of particles of the ceramic matrix.

The preparation of the oxygen carrier solid according to the invention is described in detail later on in the description.

The Redox Active Mass

The oxygen carrier solid according to the invention comprises a redox active mass which comprises, and preferably consists of, at least one metal oxide included in the list consisting of the oxides of Fe, Cu, Ni, Mn and Co, a perovskite having redox properties, preferably a perovskite of formula $CaMnO_3$, a metal aluminate spinel having redox properties, for example a metal aluminate spinel of formula $CuAl_2O_4$ or of formula $CuFe_2O_4$. The spinel of formula $CuFe_2O_4$ is a cuprospinel.

Preferably, the redox active mass comprises at least one copper oxide, preferably of formula CuO, and more preferentially consists of at least one copper oxide, preferably of formula CuO.

According to the invention, the oxygen carrier solid advantageously has an active mass dispersed within the ceramic matrix, typically an initial distribution of the initial active mass which is relatively homogeneous, and the migration of the active mass within the particles of the oxygen carrier solid is minimized during the redox cycles of the chemical looping redox process, as is illustrated by some examples later on in the description.

The redox active mass is capable of exchanging oxygen under the redox conditions of the chemical looping redox process. The active mass is reduced according to the reaction (1) already described above, during a reduction step in contact with a hydrocarbon feedstock, and is oxidized according to reaction (2) or (3) already described above, during an oxidation step in contact with an oxidizing gas.

The oxygen storage capacity of the redox active mass is advantageously, depending on the type of material, between 1% and 15% by weight. Advantageously, the amount of oxygen actually transferred by the metal oxide is between 1 and 3% by weight, which makes it possible to use only a fraction of the oxygen transfer capacity.

Form of the Oxygen Carrier Solid

The oxygen carrier solid according to the invention is preferably in the form of particles, which can be fluidized in the chemical looping redox process, in particular can be used in a circulating fluidized bed. They may be fluidizable particles (fluidizable powder, generally referred to as "fluidizable carrier") belonging to groups A, B or C of the Geldart classification (D. Geldart, "Types of gas fluidization", Powder Technol., 7(5), 285-292, 1973), and preferably the particles belong to group A or group B of the Geldart classification, and preferably to group B of the Geldart classification.

Preferably, the particles of the oxygen carrier solid have a particle size such that more than 90% of the particles have a size of between 50 µm and 600 µm, more preferentially a particle size such that more than 90% of the particles have a size of between 80 µm and 400 µm, even more preferentially a particle size such that more than 90% of the particles have a size of between 100 µm and 300 µm, and even more preferentially a particle size such that more than 95% of the particles have a size of between 100 µm and 300 µm.

Preferably, the particles of the oxygen carrier solid have a grain density of between 500 kg/m$^3$ and 5000 kg/m$^3$, preferably a grain density of between 800 kg/m$^3$ and 4000 kg/m$^3$, and even more preferentially a grain density of between 1000 kg/m$^3$ and 3000 kg/m$^3$.

The particles of the oxygen carrier solid are preferably substantially spherical.

The size distribution and morphology of the particles for use in another type of chemical looping process (CLC, CLR, CLOU) in a fixed bed, in a moving bed or in a rotating reactor are suitable for the process envisaged. For example, in the case of a use of the oxygen carrier solid in a process using a fixed bed or rotating reactor technology, the preferred size of the particles is greater than 400 µm, in order to minimize the pressure drops in the reactor(s), and the morphology of the particles is not necessarily spherical. The morphology is dependent on the shaping mode, for example in the form of extrudates, beads, monoliths or particles of any geometry obtained by grinding larger particles. In the case of a shaping of monolithic type, the oxygen carrier solid, in the form of particles, is deposited on the surface of the ceramic monolith channels by the coating methods known to those skilled in the art or else the monolith itself consists of the particles according to the invention.

The size of the particles can be measured by laser particle size analysis.

The size distribution of the particles of the oxygen-carrying solid is preferably measured using a laser particle size analyser, for example Malvern Mastersizer 3000, preferably by the liquid route, and using Fraunhofer theory. Such a technique and such a material may also be used to measure the size of other grains such as the grains of precursor oxides of the ceramic matrix.

Obtaining particles of the oxygen carrier in the desired size range requires a step of shaping starting from smaller grains, the size of which is between 0.1 and 20 µm, preferentially between 0.5 and 5 µm, and more preferably between 1 and 3 µm. The shaping may be carried out according to any technique known to those skilled in the art that makes it possible to obtain particles, such as extrusion, compacting, wet or dry granulation, for example agglomeration on a granulating plate or a granulating drum, freeze granulation, or by drop (oil drop) coagulation techniques, and preferably using a technique of spray drying or agglomeration on a granulating plate or granulating drum, enabling particles of spherical shape to be obtained.

A step of sieving and/or screening (grading or separating for example by means of a cyclone) may also be carried out in order to select the particles of the desired particle size.

Preparation of the Oxygen Carrier Solid

The oxygen carrier solid may be prepared according to a process comprising the following steps:

Step (A): Preparation of a Suspension of Precursor Oxide (s) of a Ceramic Matrix Step (A) comprises the preparation of an aqueous suspension of an oxide or a mixture of oxides, said solution having rheological characteristics suitable for pumping and spraying. The oxide or oxides form grains, the size of which is between 0.1 µm and 20 µm, preferably between 0.5 µm and 5 µm, and more preferably between 1 µm and 3 µm.

The oxide or mixture of oxides are the precursors of the ceramic matrix of the oxygen carrier solid and have a melting point above 1500° C., preferably above 1700° C., and even more preferentially above 2000° C.

These components are preferably selected from the list consisting of calcium aluminate of formula $CaAl_2O_4$, silica of formula $SiO_2$, titanium dioxide of formula $TiO_2$, perovskite of formula $CaTiO_3$, alumina of formula $Al_2O_3$, zirconia of formula $ZrO_2$, yttrium dioxide of formula $Y_2O_3$, barium zirconate of formula $BaZrO_3$, magnesium aluminate of formula $MgAl_2O_4$, magnesium silicate of formula $MgSi_2O_4$, lanthanum oxide of formula $La_2O_3$.

One or more organic and/or inorganic binders may be added to the suspension in order to adjust and control the rheology of the suspension and to ensure the cohesion of the particles that are obtained at the end of the shaping step, before the consolidation by calcination in a subsequent step.

The organic binder(s) of varying molar mass may be selected from polyethylene glycol (PEG), polyvinyl alcohol (PVA), polyacrylate (PA), polyvinylpyrrolidone (PVP), etc. They may be added in an amount of from 0.5% to 6% by weight relative to the mass of oxide(s) in suspension.

The inorganic binder(s) may be selected from the aluminum oxides (bayerite, gibbsite, nordstrandite), boehmite, diaspore, tetraethylorthosilicate, silicic acid, aluminosilicates and kaolin-type clays, etc. They may be added in an amount of from 5% to 30% by weight relative to the mass of oxide(s) in suspension.

One or more pore-forming agents intended to increase the macroporosity of the particles may also be added to the suspension. Preferably, when such agents are added to the solution, the amount thereof is preferably less than 25% by weight relative to the mass of oxide(s) in suspension. Such agents are typically organic compounds which can be burnt, such as starch, cellulose, polymers such as polypropylene, latex, poly(methyl methacrylate) (PMMA).

Step (B): Spray Drying

In this step, the suspension obtained in step (A) is spray dried: the suspension is sprayed in fine droplets in a drying chamber using spraying means, for example using a pneumatic (two-fluid) or hydraulic (single-fluid) spray nozzle, and these droplets are at the same time brought into contact with a hot carrier gas, preferably air or nitrogen, brought to a temperature between 200° C. and 350° C. The hot carrier gas is introduced with a co-current flow (ceiling mode) or mixed flow (fountain mode) enabling the evaporation of the solvent and the obtaining of spherical particles with the desired particle size.

This step advantageously enables the formation of particles of the desired particle size. Preferably, this step is carried out so as to produce particles of the following particle size: more than 90% of the particles have a size between 50 and 600 µm, preferably more than 90% of the particles have a size between 80 µm and 400 µm, even more preferentially more than 90% of the particles have a size between 100 µm and 300 µm, and even more preferentially more than 95% of the particles have a size between 100 µm and 300 µm.

A subsequent optional screening step (D) may be carried out in order to obtain the desired particle size, described below.

Step (C): Calcining of the Spray-Dried Particles

The particles from the spray drying in step (B) are calcined in air at a temperature between 400° C. and 1400° C., preferentially between 600° C. and 1200° C., and very preferably between 650 and 900° C. This calcining step has an impact on the mechanical strength of the particles.

It is possible to perform a temperature rise ramp of between 1° C./min and 50° C./min, and preferably between 5° C./min and 20° C./min in order to reach the given calcining temperature, especially when the integration of the redox active mass in the oxygen carrier solid is carried out according to step e2) j) described below (prior impregnation by the precursor of the active mass of the oxide grains that are suspended in step (A)).

Step (D): Optional Screening of the Particles

A screening may be carried out at the end of the calcination step (C) that aims to select the particles in a desired size range. The screening may be carried out by separating the particles using a cyclone, or any other separation means.

Step (E): integration of the redox active mass

Step (E) comprises either step e1), or step e2). Step (E) makes it possible to combine the redox active mass with the ceramic matrix in order to produce the oxygen carrier solid in the form of particles according to the invention.

Step e1): impregnation, drying and calcining of the particles of the ceramic matrix According to this step e1), the calcined particles obtained at the end of step (C), and optionally screened at the end of step (D), are (i) impregnated with an aqueous or organic solution containing at least one soluble precursor compound of copper, nickel, cobalt, iron or manganese.

Preferably, the impregnation is carried out with an aqueous solution containing at least one precursor compound of the redox active mass selected from the list consisting of the nitrates of the following formulae: $Cu(NO_3)_2.xH_2O$, $Ni(NO_3)_2.xH_2O$, $Co(NO_3)_2.xH_2O$, $Fe(NO_3)_3.xH_2O$, $Mn(NO_3)_2.xH_2O$.

Advantageously, copper nitrate $Cu(NO_3)_2.xH_2O$ is selected to carry out this impregnation, in order to obtain a redox active mass of copper oxide(s), for example a copper oxide of formula CuO, to form the oxygen carrier solid.

The amount of precursor of the redox active mass used for the impregnation step is selected so that the redox active mass constitutes between 5% and 75% by weight of the oxygen carrier solid, preferably constitutes between 10% and 40% by weight of the oxygen carrier solid.

The impregnation may be carried out in one or more successive steps.

If the impregnation is carried out in several successive steps, intermediate steps of drying at a temperature of between 30° C. and 200° C. and/or of calcining at a temperature of between 200° C. and 600° C. are preferably carried out.

The impregnated particles are then (ii) dried, for example in an oven, and preferably in air or in a controlled atmosphere (controlled relative humidity, under nitrogen). A controlled atmosphere is understood to mean, for example, with a controlled relative humidity or under nitrogen. This drying is carried out at a temperature between 30° C. and 200° C.

More preferentially, this drying is carried out in air at a temperature between 100° C. and 150° C.

Finally, the impregnated and dried particles are then (iii) calcined. This second calcining step (the first being that of step (C)) leads to the oxygen carrier solid in the form of particles according to the invention.

This calcination (iii) is preferably carried out in air between 450° C. and 1400° C., more preferentially between 600° C. and 1000° C., and even more preferentially between 700° C. and 900° C.

This calcination may be carried out for a period of 1 to 24 hours, and preferably for a period of 5 to 15 hours.

Advantageously, a temperature rise ramp of between 1° C./min and 50° C./min, and preferably between 5° C./min and 20° C./min, is applied to achieve the given calcination temperature. The time for implementing this temperature ramp is not included in the calcination time ranges indicated above.

This calcination enables the formation of the redox active mass dispersed within the ceramic matrix.

It also appears that this calcination step (iii) has a limited impact on the initial macroporous structure of the particles, that is even more limited when the calcination is carried out at a temperature between 700° C. and 900° C. A small increase in the diameter of the macropores and a small decrease in total pore volume may be observed.

Step e2)

According to step e2), and alternatively to what is carried out in step e1), the redox active mass is combined with the ceramic matrix during the preparation of the suspension in step (A).

The incorporation of the redox active mass can then be carried out according to one of the following three steps:

(j) impregnating, with at least one soluble precursor compound of copper, nickel, cobalt, iron or manganese, the grains of the oxide, of one of the oxides or of all the oxides used for preparing the suspension in step (A). Said water-soluble precursor compound of the active mass may be selected from the list consisting of nitrates of the following formulae: $Cu(NO_3)_2.xH_2O$, $Ni(NO_3)_2.xH_2O$, $Co(NO_3)_2.xH_2O$, $Fe(NO_3)_3.xH_2O$, $Mn(NO_3)_2.xH_2O$. The impregnation is carried out before the grains are suspended. Advantageously, a soluble precursor of copper, and preferably copper nitrate $Cu(NO_3)_2.xH_2O$ is selected to carry out this impregnation, in order to obtain a redox active mass of copper oxide(s), for example a copper oxide of formula CuO, to form the oxygen carrier solid. A drying step followed by a calcining step, such as those described in steps e1) (ii) and (iii) may be carried out following this impregnation (j).

(jj) adding at least one soluble precursor of copper, nickel, cobalt, iron, and/or manganese to the suspension prepared in step (A). Advantageously, the soluble compound is selected from the list consisting of the nitrates of the following formulae: $Cu(NO_3)_2.xH_2O$, $Ni(NO_3)_2.xH_2O$, $Co(NO_3)_2.xH_2O$, $Fe(NO_3)_3.xH_2O$, $Mn(NO_3)_2.xH_2O$. Preferably the selected precursor is a soluble compound of copper, more preferentially the copper nitrate $Cu(NO_3)_2.xH_2O$.

(jjj) adding, to the suspension prepared in step (A), at least one oxide of copper, nickel, cobalt, iron or manganese, a perovskite that has redox properties (for example $CaMnO_3$), a metal aluminate spinel that has redox properties (for example $CuFe_2O_4$, $CuAl_2O_4$), or any other compound capable of exchanging oxygen under the redox conditions of the chemical looping redox process such as CLC. These precursors of the active mass added to the suspension prepared in step (A) are solids in the form of grains, having a size between 0.1 µm and 20 µm, preferably between 0.5 µm and 5 µm, and more preferably between 1 µm and 3 µm. Preferably, a copper oxide is added to the suspension prepared in step (A).

The preparation of the oxygen carrier solid according to the invention may comprise the recycling to step E) of fines of the oxygen carrier produced during the use thereof in a chemical looping redox process such as CLC, for example by adding, during step (jjj), to the suspension prepared in step (A), less than 10% by weight of fines relative to the total content of oxide(s) of the suspension. The recycled fines consist of a mixture of the active mass and of the ceramic matrix, the size of which is less than 40 μm. A step of grinding the fines is therefore necessary to achieve a size distribution of the fine particles of between 0.1 μm and 20 μm, preferably between 0.5 μm and 5 μm, and more preferably between 1 μm and 3 μm.

Use of the Oxygen Carrier Solid

The oxygen carrier solid is intended to be used in a chemical looping redox process.

The invention thus relates to a chemical looping redox process using the oxygen carrier solid as described, or prepared according to the preparation process as described.

Advantageously, the oxygen carrier solid described is used in a CLC process of a hydrocarbon feedstock, in which the oxygen carrier solid is in the form of particles and circulates between at least one reduction zone and one oxidation zone both operating in a fluidized bed.

The temperature in the reduction zone and in the oxidation zone is between 400° C. and 1400° C., preferably between 600° C. and 1100° C., and even more preferentially between 800° C. and 1100° C.

The hydrocarbon feedstock treated may be a solid, liquid or gaseous hydrocarbon feedstock: gaseous fuels (e.g.: natural gas, syngas, biogas), liquid fuels (e.g.: fuel oil, bitumen, diesel, gasolines, etc.), or solid fuels (e.g.: coal, coke, petcoke, biomass, oil sands, etc.).

The operating principle of the CLC process in which the oxygen carrier solid described is used is as follows: a reduced oxygen carrier solid is brought into contact with a stream of air, or any other oxidizing gas, in a reaction zone referred to as an air reactor (or oxidation reactor). This results in a depleted air stream and a stream of reoxidized particles of the oxygen carrier solid. The stream of particles of oxidized oxygen carrier is transferred to a reduction zone referred to as a fuel reactor (or reduction reactor). The stream of particles is brought into contact with a fuel, typically a hydrocarbon feedstock. This results in a combustion effluent and a stream of particles of reduced oxygen carrier. The CLC plant may include various pieces of equipment, for heat exchange, pressurization, separation or possible recirculations of material around the air and fuel reactors.

In the reduction zone, the hydrocarbon feedstock is brought into contact, preferably concurrently, with the oxygen carrier solid in the form of particles comprising the redox active mass in order to carry out the combustion of said feedstock by reducing the redox active mass. The redox active mass $M_xO_y$, M representing a metal, is reduced to the $M_xO_{y-2n-m/2}$ state, by means of the hydrocarbon feedstock $C_nH_m$, which is correspondingly oxidized to $CO_2$ and $H_2O$, according to reaction (1) already described, or optionally to a $CO+H_2$ mixture depending on the proportions used. The combustion of the feedstock in contact with the active mass is carried out at a temperature generally between 400° C. and 1400° C., preferentially between 600° C. and 1100° C., and more preferentially between 800° C. and 1100° C. The contact time varies depending on the type of combustible feedstock used. It typically varies between 1 second and 10 minutes, for example preferably between 1 and 5 minutes for a solid or liquid feedstock, and for example preferably from 1 to 20 seconds for a gaseous feedstock.

A mixture comprising the gases from the combustion and the particles of the oxygen carrier solid is discharged, typically at the top of the reduction zone. Gas/solid separation means, such as a cyclone, make it possible to separate the combustion gases from the solid particles of the oxygen carrier in their most reduced state. The latter are sent to the oxidation zone to be re-oxidized, at a temperature generally between 400° C. and 1400° C., preferentially between 600° C. and 1100° C., and more preferentially between 800° C. and 1100° C.

In the oxidation reactor, the active mass is restored to its oxidized state $M_xO_y$ in contact with the air, according to reaction (2) already described (or according to reaction (3) if the oxidizing gas is $H_2O$), before returning to the reduction zone, and after having been separated from the oxygen-depleted air discharged at the top of the oxidation zone 100.

The active mass, passing alternately from its oxidized form to its reduced form and vice versa, follows a redox cycle.

The disclosed oxygen carrier solid may also be used in another chemical looping redox process such as a CLR process or a CLOU process.

The technology used in the chemical looping redox process is preferably that of the circulating fluidized bed, but is not limited to this technology, and can be extended to other technologies such as fixed bed, moving bed or ebullated bed technology, or else rotating reactor technology.

EXAMPLES

The advantage of the oxygen carrier solids according to the invention in the chemical looping processes, in particular CLC, in particular the minimization of the migration of the active mass within the particles during the redox cycles, is disclosed through the examples 1 to 5 below.

Examples 2 and 3 relate to oxygen carrier solids not in accordance with the invention. Examples 4 and 5 relate to oxygen carrier solids in accordance with the invention.

Example 1

Aging Test for Oxygen Carrier Solids in a Batch Fluidized Bed

The aging of the oxygen carrier solids in a batch fluidized bed was carried out in a unit consisting of a quartz reactor, an automated system for supplying the reactor with gas and a system for analyzing the gases leaving the reactor.

This aging test approximates the conditions of use of the oxygen carrier solid in a chemical looping redox process, in particular a chemical looping combustion redox process.

The gases ($CH_4$, $CO_2$, $N_2$, air) are distributed by mass flow meters. For safety reasons, a nitrogen purge is carried out after each reduction period and oxidation period.

The height of the quartz reactor is 30 cm, with a diameter of 4 cm in its lower part (24 cm from the top), and of 7 cm in its upper part. A quartz frit is placed at the bottom of the reactor to ensure the distribution of the gases and a good fluidization of the particles. Another frit is placed in the upper part of the reactor to prevent the loss of fines during the test. The reactor is heated using an electric furnace. Part of the gas leaving the reactor is pumped to the gas analyzers, cooled to condense most of the water formed during the reduction and then dried using calcium chloride. The gas concentrations are measured using nondispersive infrared analyzers for CO, $CO_2$ and $CH_4$, a paramagnetic analyzer for oxygen, and a TCD detector for hydrogen.

Standard test conditions: 100 grams of particles are introduced into the quartz reactor and then heated to 900° C. in a stream of air (60 Nl/h). When the temperature of the bed is stabilized at 900° C. in air, 250 cycles are carried out according to the following steps:

1—Nitrogen purge (60 Nl/h)
2—Injection of a $CH_4/CO_2$ mixture (30 Nl/h/30 Nl/h) (reduction of the particles)
3—Nitrogen purge (60 Nl/h)
4—Injection of air (60 Nl/h) (oxidation of the particles)

The conversion of the oxygen carrier solid (amount of oxygen supplied by the oxygen carrier solid to carry out the methane conversion, expressed in % by weight of the oxidized oxygen carrier) is calculated from the gas conversion data, and the reduction time (step 2 of the cycle) is adjusted after the first cycle so that the oxygen carrier solid releases about 2% by weight of oxygen (relative to the oxidized mass of oxygen carrier solid introduced) in each reduction cycle. The oxidation time (step 4 of the cycle) is sufficient to completely reoxidize the particles (15 min).

The particle size distribution was measured with a Malvern particle size analyzer, using Fraunhofer theory.

The mercury porosimetry measurements were performed on the Autopore IV device marketed by Micromeritics, taking into account a mercury surface tension of 485 dyn/cm and a contact angle of 140°. The minimum pore size that can be measured by mercury porosimetry is 3.65 nm.

The nitrogen adsorption isotherms were carried out on the ASAP 2420 device marketed by Micromeritics.

Example 2

CuO/Alumina Oxygen Carrier Solid

According to this example 2, an oxygen carrier solid is formed from alumina as a support matrix for a redox active mass of copper oxide(s).

The alumina used for this example is Puralox SCCa 150-200 marketed by Sasol. The particle size distribution of the aluminous support indicates $Dv10=104$ μm, $Dv50=161$ μm and $Dv90=247$ μm. The pore volume of the particles measured by mercury porosimetry is 0.450 ml/g, and the pore size distribution is between 5 and 15 nm, centered on 9 nm. The macropore volume of the support measured by mercury porosimetry is 0.007 ml/g (1.5% of the total pore volume).

The nitrogen adsorption isotherm of the Puralox makes it possible to measure a specific surface area of 199 $m^2/g$, a micropore volume (pores<2 nm) of zero and a mesopore volume (2 nm<pores<50 nm) of 0.496 ml/g.

233 g of Puralox alumina were impregnated according to the dry impregnation method with 96.5 g of copper nitrate trihydrate dissolved in the necessary volume of demineralized water. After drying at 120° C. and calcining at 850° C. for 12 h, a solid containing 12% by weight of CuO is obtained; the crystallographic phases detected by XRD are $\gamma$-$Al_2O_3$ and CuO. The distribution of copper within the particles is homogeneous.

The pore volume of the particles of the solid obtained, measured by mercury porosimetry, is 0.367 ml/g, of which 0.015 ml/g (i.e. 4% of the total pore volume measured by mercury porosimetry) is due to the macroporosity. The pore size distribution is between 5 and 20 nm and centered on 11.25 nm, as can be seen in the graph of FIG. 1A representing the volume of mercury injected Vi (ml/g) into the porosity, and also the ratio dV/dD (derivative of (volume of Hg introduced/pore size), giving information on the pore size distribution), as a function of the pore diameter (nm), for the oxygen carrier solid according to this example. The particles are therefore essentially mesoporous.

The nitrogen adsorption isotherm of the oxygen carrier solid according to this example makes it possible to measure a specific surface area of 135 $m^2/g$, a micropore volume (pores<2 nm) of zero and a mesopore volume (2 nm<pores<50 nm) of 0.404 ml/g.

The oxygen carrier solid according to this example was aged under the conditions described in example 1.

Figure 1B:
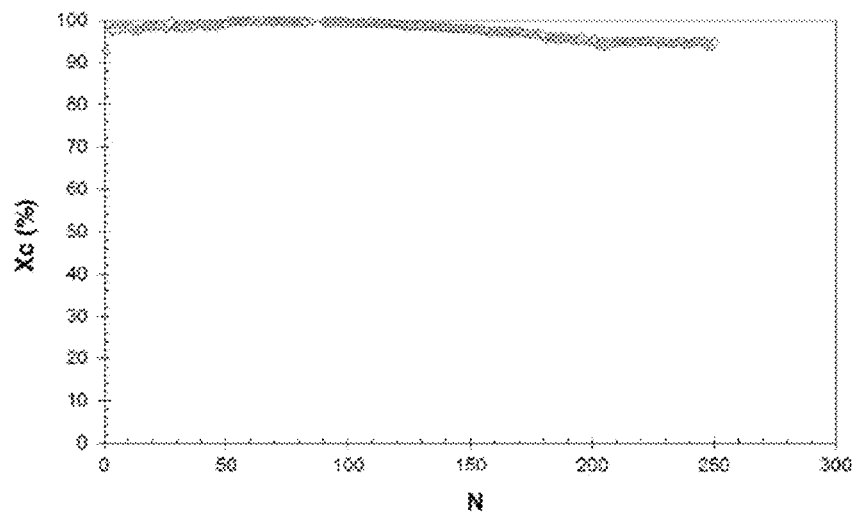

FIG. 1B is a graph representing the normalized degree of conversion Xc of methane as a function of the number N of redox cycles in a CLC process using the oxygen carrier solid according to example 2.

The conversion of methane is of the order of 98% at the start of the test, it increases until it reaches 100%, then a gradual deactivation is observed after the hundredth cycle. The conversion then stabilizes around 95%.

It should be noted that the nature of the active mass used (CuO) leads to the appearance of oxygen during the nitrogen purge step. The particles may therefore be used either in a CLC or CLOU process.

Figure 1C:
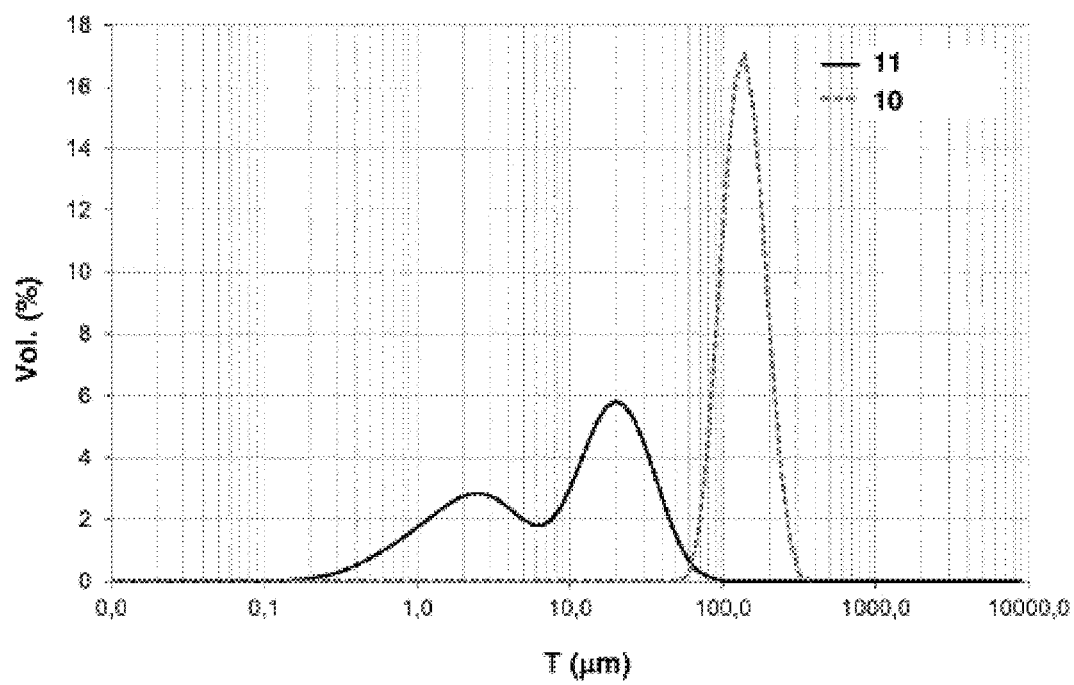

After the test, the sample underwent a very significant attrition, with almost all the particles having a size of less than 100 μm, as is clearly visible in the graph of FIG. 1C, representing the particle size distribution (μm) of the oxygen carrier solid according to this example before (curve 10) and after (curve 11) the use thereof in a CLC process, i.e. before and after the aging test according to example 1.

Figure 1D:
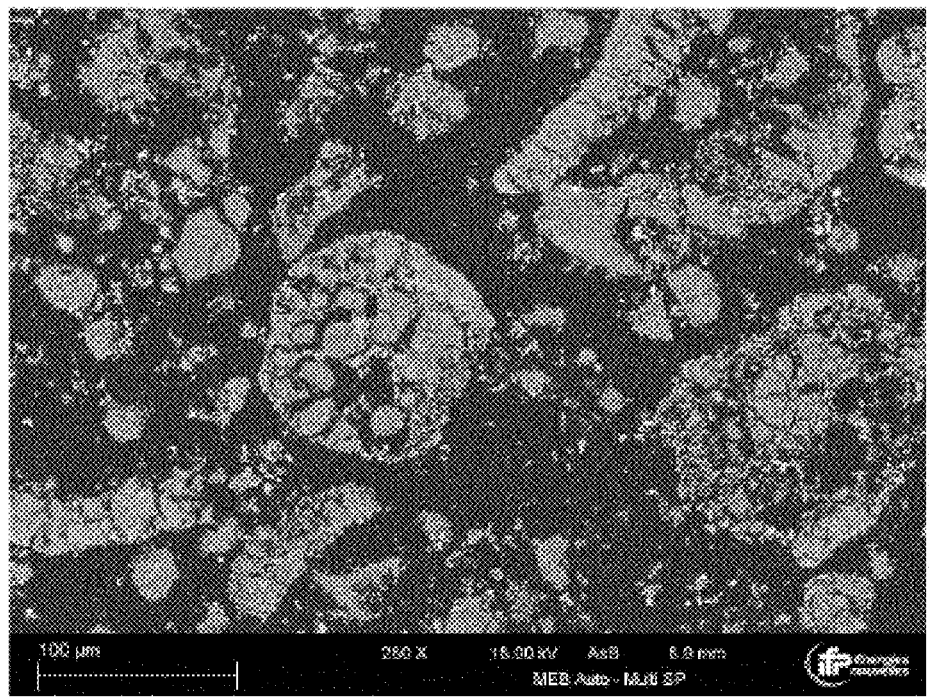

The SEM images on a polished section of the particles after the aging test according to example 1, such as the image from FIG. 1D, show that the constituent aluminous matrix of the particles did not withstand the 250 successive redox cycles. Most of the particles are actually in the form of small fragments (a few tens of μm). In addition, additional SEM-EDX analyses show that the finest particles observed (a few μm in size) consist almost exclusively of copper and oxygen.

This example shows that when the active mass is deposited on a purely mesoporous alumina, the accumulation of redox cycles leads to the cracking of said aluminous matrix, and to the migration of the copper within the aluminous matrix to form clusters composed essentially of copper. The mechanical strength of the cracked ceramic matrix is then insufficient and the lifetime of the particles is drastically reduced.

Example 3

CuO/5% $SiO_2$ Siliceous Alumina Oxygen Carrier Solid

According to this example 3, an oxygen carrier solid is formed from 5% $SiO_2$ siliceous alumina as a support matrix for a redox active mass of copper oxide(s) (CuO and $CuAl_2O_4$).

The siliceous alumina used is Siralox 5 marketed by Sasol and which contains 5% by weight of silica ($SiO_2$). The particle size distribution indicates $Dv_{10}=60$ μm, $Dv_{50}=89$ μm and $Dv_{90}=131$ μm. The pore volume measured by mercury porosimetry of the alumina-silica support is 0.549 ml/g, and the pore size distribution is between 5 and 30 nm, centered on 13 nm. The macropore volume is 0.033 ml/g, i.e. 6% of the total pore volume measured by mercury porosimetry.

The nitrogen adsorption isotherm of the Siralox 5 makes it possible to measure a specific surface area of 173 $m^2/g$, a micropore volume (pores<2 nm) of zero and a mesopore volume (2 nm<pores<50 nm) of 0.601 ml/g.

Figure 2A:
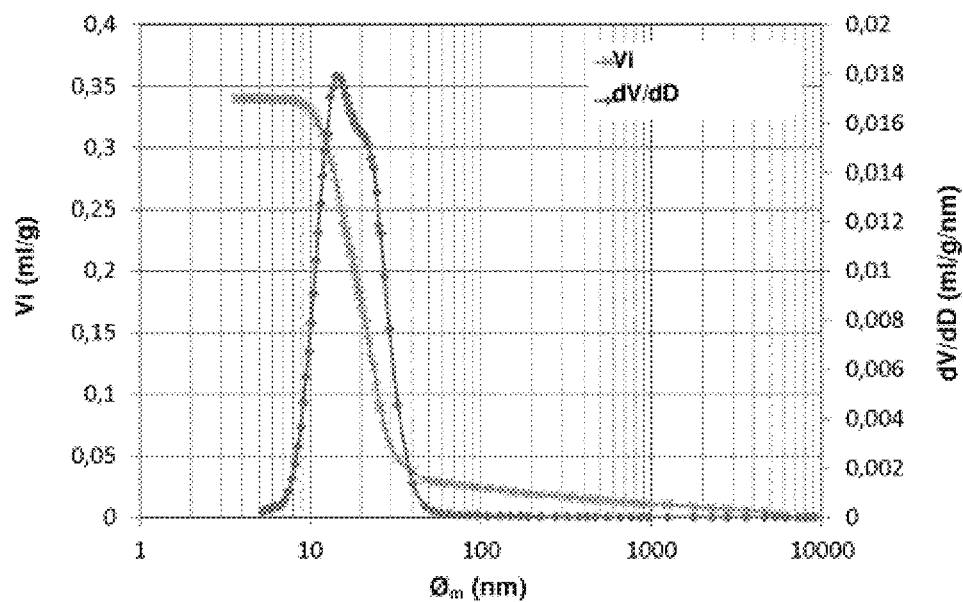
FIGS. 2A, 2B, 2C and 2D relate to an oxygen carrier solid according to example 3 (example not in accordance with the invention).

240 g of siliceous alumina were impregnated according to the dry impregnation method with 109 g of copper nitrate trihydrate in aqueous solution. After drying at 120° C. and calcining at 1000° C. for 12 h, a solid containing 13% by weight of CuO equivalent is obtained. The crystallographic phases detected by XRD are $\delta$-$Al_2O_3$, $\theta$-$Al_2O_3$, $CuAl_2O_4$ and CuO. The SEM backscattered electron image (a) on a polished section and the EDX mapping (b) of FIG. 2C show that the copper is relatively well dispersed within the particles, but less homogeneously than in example 2.

The pore volume of the particles measured by mercury porosimetry is 0.340 ml/g, of which 0.029 ml/g (8.5%) is due to macroporosity. The pore size distribution is between 7 and 50 nm and centered on 15 nm, as can be seen in the graph of FIG. 2A representing the volume of mercury injected Vi (ml/g) into the porosity, and also the ratio dV/dD, as a function of the pore diameter (nm), for the oxygen carrier solid according to this example. The particles after impregnation/calcination are essentially mesoporous.

The specific surface area measured by nitrogen adsorption is 77 $m^2$/g.

The oxygen carrier solid according to example 3 was aged under the conditions described in example 1.

Figure 2B:
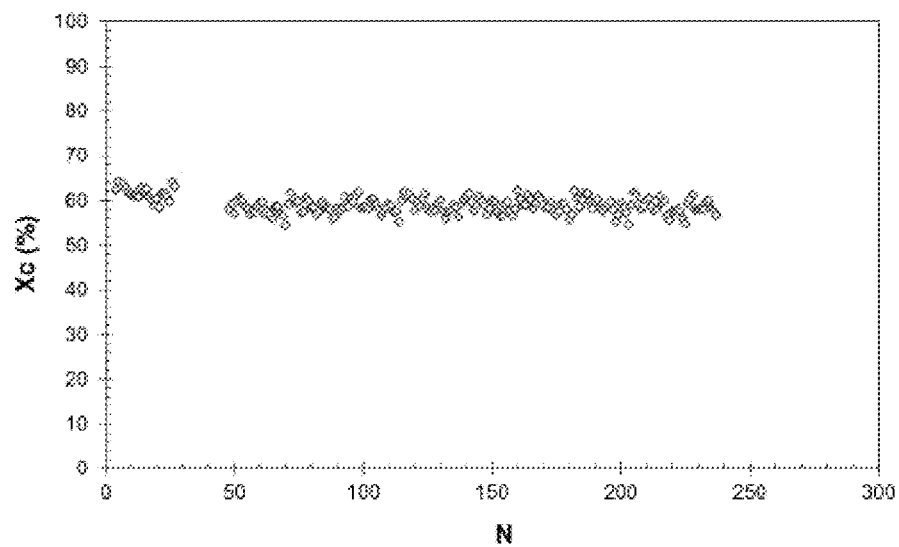
Figure 2C:
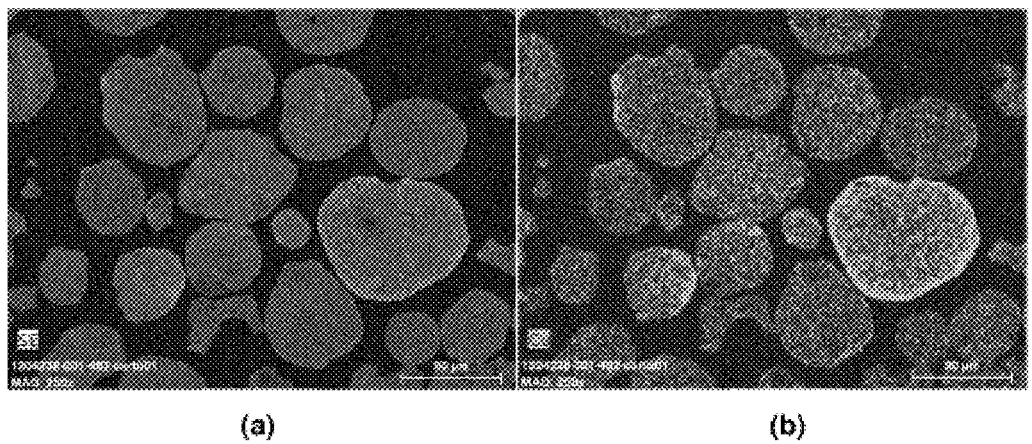

The methane conversion is stable, of the order of 60% over the entire test (FIG. 2B).

It should be noted that the nature of the active mass used (CuO) leads to the appearance of oxygen during the nitrogen purge step. The particles may therefore be used either in a CLC or CLOU process.

The partial conversion of methane with respect to example 2 is not a problem regarding the CLC or CLOU process on an industrial scale, it being possible for the complete conversion of the fuel to be achieved by modifying the residence times of the particles, the gas velocities and/or the inventory in the reduction reactor.

The size distribution of the particles after the aging test is similar to that of the material before testing, which indicates a better mechanical strength of the alumina-silica matrix compared to the particles on pure alumina.

Figure 2D:
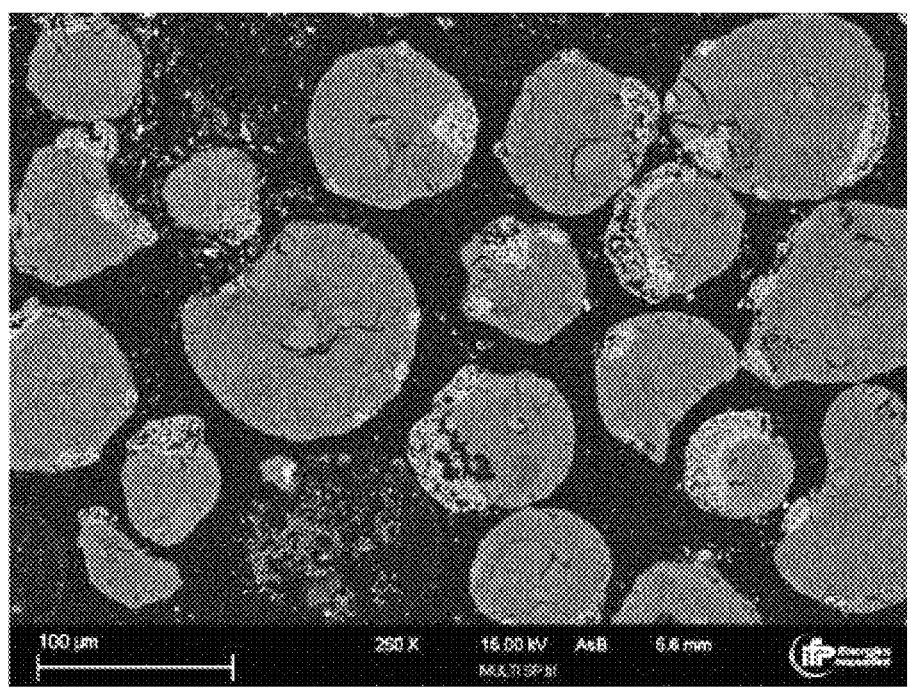

It is observed, however, that almost all of the copper initially dispersed within the particles migrated to the periphery of said particles to form porous zones containing essentially copper and a little aluminum, as can be seen in the SEM image of FIG. 2D. The mechanical strength of these zones, although porous, is sufficient so that the layers and clusters formed are still in most cases integral with the initial alumina-silica support under the conditions described in example 1. However, it is not possible to use particles of this type in a circulating fluidized bed on an industrial scale, where the higher gas velocities and the inevitable attrition by abrasion would result in the rapid elimination of all of the copper accumulated at the periphery.

According to the EDS measurements carried out, the zone of the particles where the morphology is relatively unchanged with respect to the initial silica-alumina consists predominantly of alumina and contains only traces of copper, and also almost all of the silicon. The presence of silicon in the ceramic matrix thus makes it possible to stabilize said ceramic matrix. However, all the copper initially well dispersed in the mesoporous matrix migrated to the periphery of the particles during successive redox cycles.

Example 4

Controlled Porosity $CuO/Al_2O_3$ Oxygen Carrier Solid

Method for Producing and Preparing the Oxygen Carrier Solid:

In examples 4, 5 and 6, the particles of the oxygen carrier solid are prepared from the synthesis of inert and stable oxide-type ceramic matrix particles that act as support for the redox active mass (non-marketed supports). The particles of the oxygen carrier solid are prepared in the following way:

Synthetic aluminosilicic materials are produced and formulated from aqueous suspensions that have been spray dried in order to result in microspherical solid particles, otherwise known as granules or microspheres.

The step of formulating the oxide support corresponds to adjusting the nature and the composition (content as weight percentage) of the substances or precursors used in the initial suspension. Once the raw materials are selected (in solid or liquid form depending on their physicochemical properties), they are then mixed with deionized water, acting as solvent, in a stirred tank in order to obtain a fluid and stable aqueous suspension. This suspension is then transferred to a spray dryer where it is sprayed in fine droplets which, during the phase of drying and evaporating the water, will form spherical solid particles with a size close to a hundred µm.

Post-treatment steps follow therefrom, such as calcining or screening of the oxide support then a step of impregnating an active metal phase followed by a last calcining of the particles make it possible to obtain an oxygen carrier material that can be used in the chemical looping redox process such as CLC.

According to this example 4, an oxygen carrier solid is formed comprising an alumina ceramic matrix within which a redox active mass of copper oxide(s) is dispersed.

The oxygen carrier solid in this example is obtained from an aqueous suspension of alumina, by implementing in particular the spray drying technique.

The alumina used for this example is a powder from a semi-industrial batch production that was obtained from an aqueous suspension of alumina using the spray drying process, as described above in the method for producing and preparing the oxygen carrier solid.

The initial aqueous suspension is composed of 61% by weight of deionized water, 27.2% by weight of gamma-alumina grains ($\gamma$-$Al_2O_3$ with a particle size $D_{v50}$=2.8 µm, 5 wt % moisture), 3.8% by weight of boehmite grains (AlOOH with a particle size $D_{v50}$=45 µm, 30 wt % moisture), 7.8% by weight of polyvinyl alcohol binder (PVA with M~4000 g/mol, 80% by weight moisture), and 0.2% by weight of nitric acid ($HNO_3$ concentrated to 68 wt %).

In this formulation, the mass ratio relative to the mass of particles of oxides in suspension, is 10.6% by weight for the inorganic binder (boehmite) and 5.2% by weight for the organic binder (PVA).

After a step of vigorous mixing of the materials within a stirred tank for 30 minutes, the spray drying of the suspension is carried out: the homogenized suspension is pumped and then sprayed in fine droplets, by means of a pneumatic nozzle positioned in the upper part of a drying chamber. Next, bringing the droplets into contact with a stream of air heated to 300° C. leads to evaporation of the water and gradual drying, which makes it possible to result in solid spherical particles collected at the bottom of the drying chamber, and having a size of between 30 µm and 200 µm.

These dry particles form a powder, which is then calcined for 4 hours in a muffle furnace at a temperature of 700° C., and then which is screened between 125 and 315 µm to remove the finest particles.

The particles obtained form the final oxide support, and this final oxide material is made up of 100% by weight of alumina ($Al_2O_3$).

The particle size distribution of the final oxide support indicates $D_{v10}$=58 µm, $D_{v50}$=159 µm and $D_{v90}$=278 µm. The pore volume measured by mercury porosimetry of the alumina support is 0.76 ml/g, and a bimodal pore size distribution is observed. The pore size distribution for the mesoporosity is between 5 and 50 nm (centered on 9.6 nm) and for the macroporosity is between 50 and 2800 nm (centered on 385 nm). The macropore volume is 0.37 ml/g, i.e. 49% of the total pore volume measured by mercury porosimetry.

200 g of this alumina are impregnated according to the dry impregnation method with 91.3 g of copper nitrate trihydrate dissolved in the necessary volume of demineralized water. After drying at 120° C. and calcining at 850° C. for 12 h, a solid containing 13% by weight of CuO equivalent is obtained.

After calcining at 800° C. for 12 h, x-ray diffraction shows that a copper aluminate ($CuAl_2O_4$) substoichiometric in Cu is formed, and also a small amount of CuO.

Figure 3A:
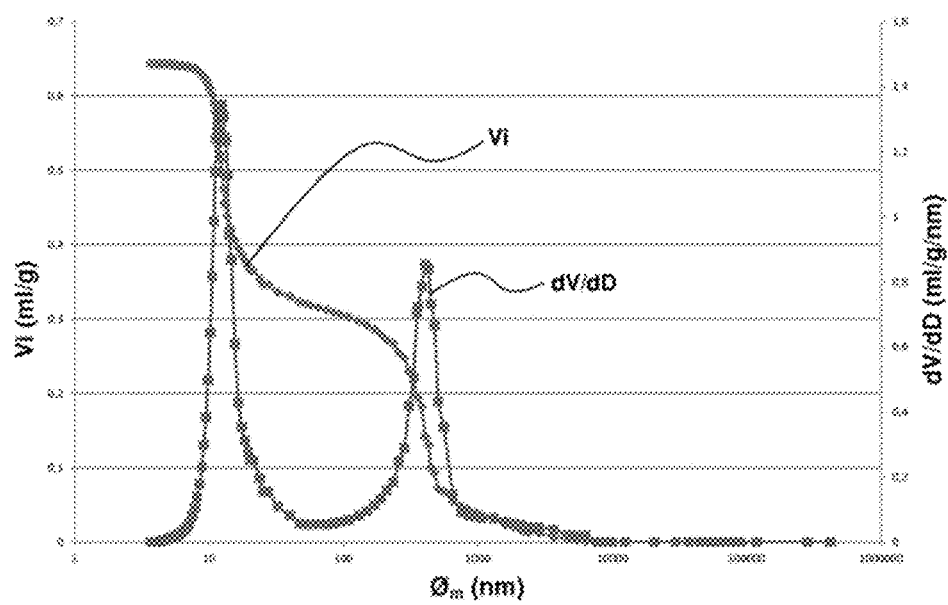
FIGS. 3A, 3B, 3C, 3D and 3E relate to an oxygen carrier solid according to example 4 (example in accordance with the invention).

The particle size distribution of the oxygen carrier solid measured by laser diffraction indicates $Dv_{10}$=82 µm, $Dv_{50}$=177 µm and $Dv_{90}$=292 µm. The pore volume measured by mercury porosimetry of the alumina support is 0.643 ml/g, and a bimodal pore size distribution is observed. The total pore volume consists, for 50%, of mesopores having a size between 7 and 50 nm, and, for 50%, of macropores having a size between 50 nm and 3 µm, centered on 400 nm. This distribution is visible in FIG. 3A, where Vi refers to the porosity of the particles of the initial oxygen carrier (before aging test). The grain density of the oxygen carrier solid is 987 kg/m$^3$.

Figure 3B:
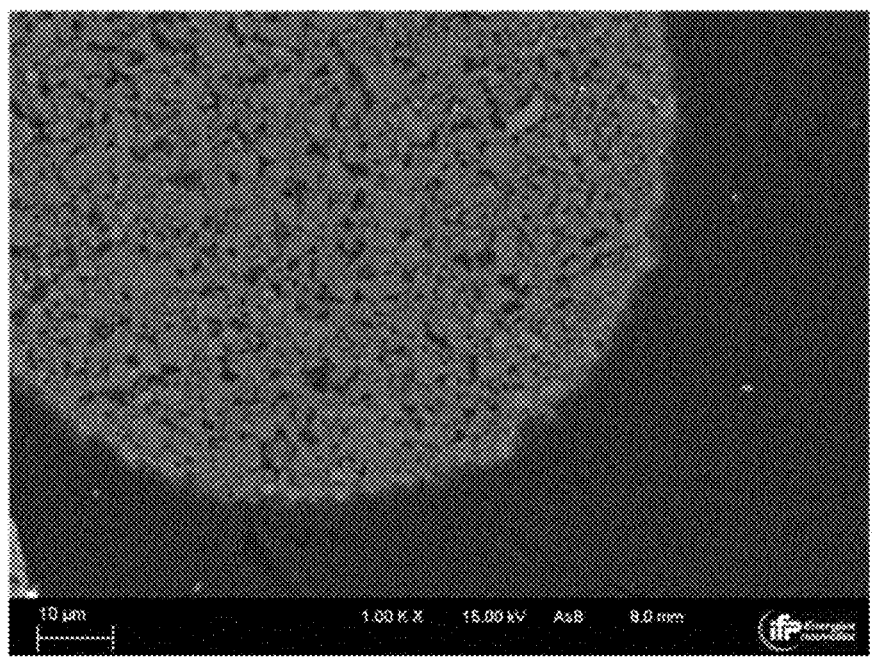

The SEM image of FIG. 3B on a polished section shows a spherical oxygen carrier particle. The small difference in contrast in backscattered electrons between the constituent grains of the oxygen carriers indicates that the copper is dispersed homogeneously within the particle.

The aging of the particles in a batch fluidized bed was carried out according to the same protocol as in example 1.

Figure 3C:
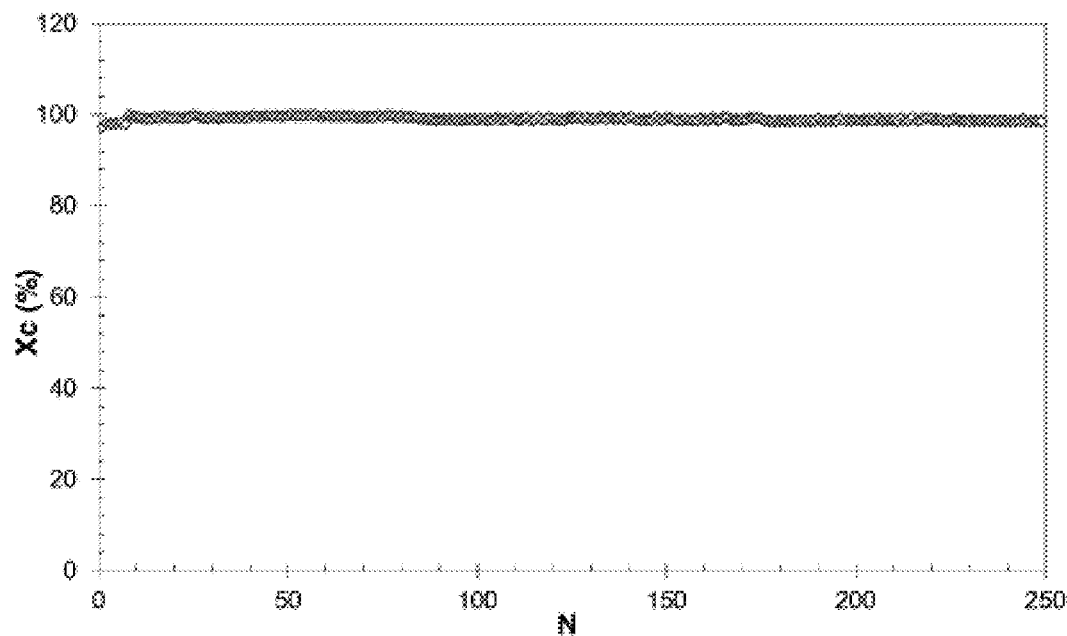

The conversion of methane into $H_2O$ and $CO_2$, visible in the graph of FIG. 3C displaying the (normalized) conversion of the methane as a function of the redox cycles during the test, is stable, of the order of 99% over the entire test.

It should be noted that the nature of the active mass used (CuO) leads to the appearance of oxygen during the nitrogen purge step. The particles may therefore be used either in a CLC or CLOU process.

The particle size distribution after the aging test is similar to that of the material before testing.

The main crystalline phases detected by XRD after aging are tenorite (CuO) and alpha-alumina. Some low-intensity peaks characteristic of copper aluminate ($CuAl_2O_4$) are also present.

Unlike the observations of example 2, the aluminous matrix has withstood the redox cycles well.

Figure 3D:
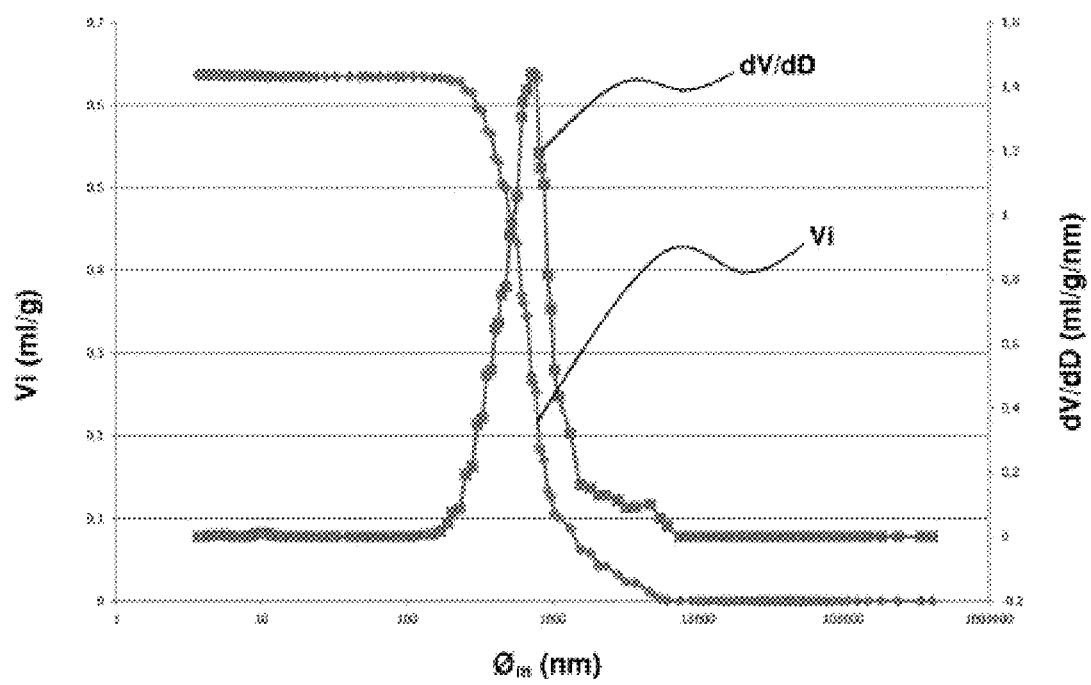
Figure 3E:
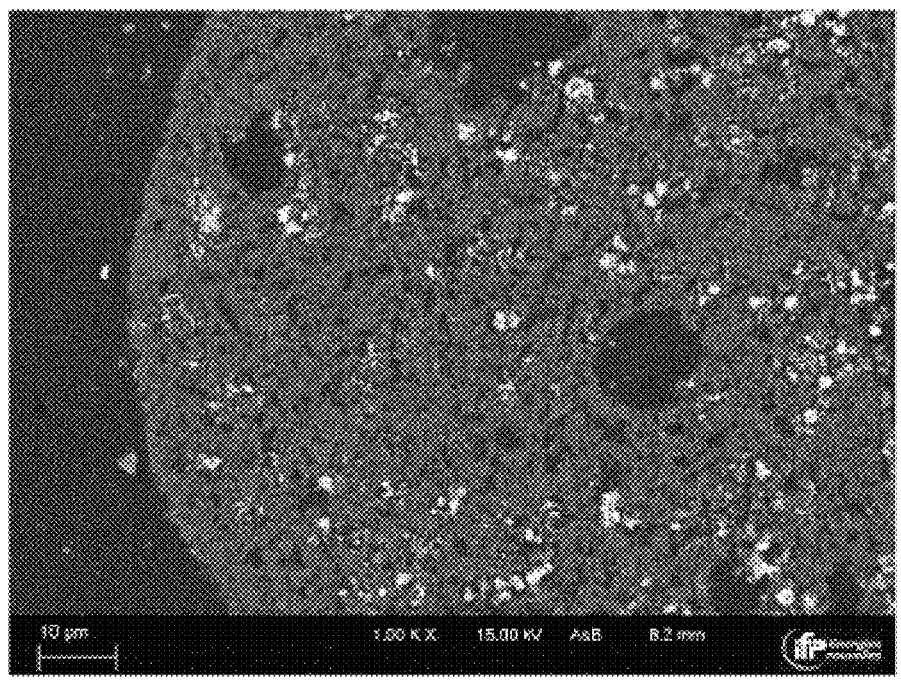
Figure 3E:
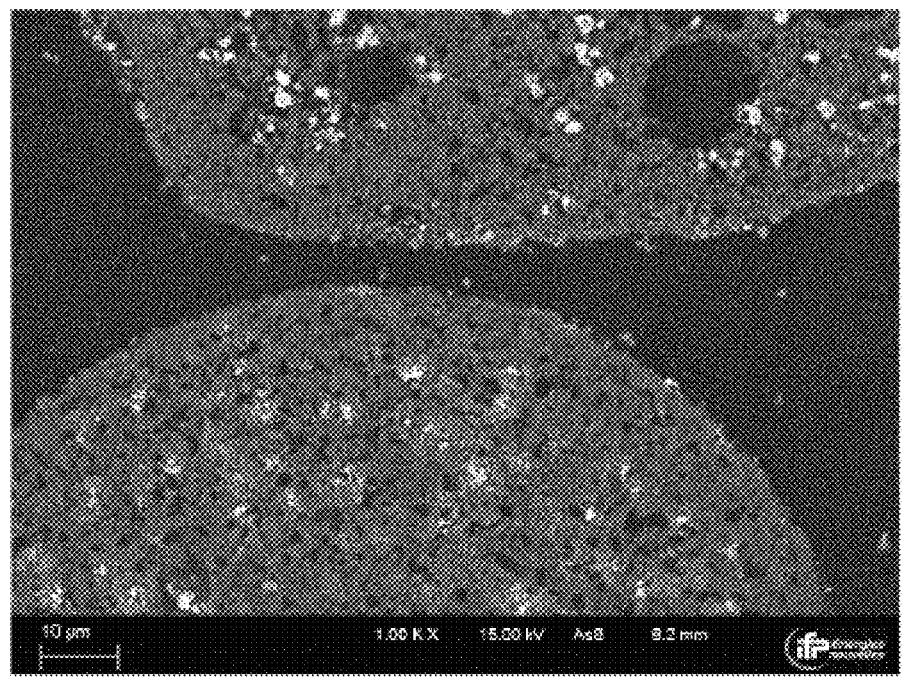

The distribution of the copper, after 250 cycles in a batch fluidized bed, within the particles of the oxygen carrier according to the invention remains relatively homogeneous, with a markedly minimized tendency for copper to migrate to the periphery of the particles compared to example 3. Cuprous nodules having a size between 0.1 µm and 5 µm (shiny CuO nodules in the SEM images (a) and (b) of FIG. 3E) are observed in the macroporosity of the particles of the oxygen carrier solid, and also some zones where the copper is more dispersed and combined with aluminum ($CuAl_2O_4$).

The total pore volume of the particles measured by mercury porosimetry (0.637 ml/g) has changed little, and consists essentially of macroporosity (0.634 ml/g). Almost all of the initial mesoporosity linked to the use of gamma-alumina disappeared to form macroporous alpha-alumina within which the copper remains dispersed.

The size of the pores after 250 cycles varies between 200 nm and 3.5 µm, and is centered on 700 nm. The alumina matrix has therefore sintered, but the pore size distribution and the pore volume limit the migration of the copper within the particles. This distribution is visible in FIG. 3D, where Vi refers to the porosity of the particles of the oxygen carrier after the aging test.

According to this example, the initially macroporous ceramic matrix withstood the 250 successive redox cycles very well and the copper remains dispersed in the form of small nodules within the macroporosity developed by the matrix. In addition, the textural evolution of particles is relatively small.

The morphological evolution of the oxygen carrier solid according to the invention (porosity and distribution of the copper) therefore makes it possible to envisage the prolonged use of these particles in an industrial chemical looping redox process, in particular in a circulating fluidized bed.

Example 5

Controlled Porosity CuO/Si—Al Oxygen Carrier Solid

According to this example 5, an oxygen carrier solid is formed comprising a siliceous alumina (13% $SiO_2$) ceramic matrix within which a redox active mass of copper oxide(s) is dispersed.

The oxygen carrier solid according to this example is obtained from an aqueous suspension comprising alumina and salicylic acid, by implementing in particular the spray drying technique.

The siliceous alumina used for this example is a powder from a semi-industrial batch production that was obtained by granulation of an aqueous suspension of alumina and silica using the spray drying process, as described in the method for producing and preparing the oxygen carrier solid.

The initial aqueous suspension was composed of 42% by weight of deionized water, 25.5% by weight of gamma-alumina grains ($\gamma$-$Al_2O_3$ with a particle size Dv50=2.8 µm, 5 wt % moisture), 4.8% by weight of boehmite grains (AlOOH with a particle size Dv50=45 µm, 30 wt % moisture), 3.7% by weight of amorphous precipitated silica grains ($SiO_2$ of Solvay Tixosil 331 commercial type, with a particle size Dv50=3.5 µm, 12% by weight moisture), 16.8% by weight of silicic acid (Si[OH]$_4$ concentrated to 50 g of $SiO_2$ per kg), 5.6% by weight of polyvinyl alcohol binder (PVA with M~4000 g/mol, 80% by weight moisture), and 1.5% by weight of nitric acid ($HNO_3$ concentrated to 68% by weight).

In this formulation, the mass ratio relative to the mass of particles of oxides in suspension, is 15% by weight for the inorganic binders (boehmite and silicilic acid) and 3.3% by weight for the organic binder (PVA).

After a step of vigorous mixing of the materials within a stirred tank for 30 min, the spray drying of the suspension is carried out: the homogenized suspension is pumped and then sprayed in fine droplets, by means of a pneumatic nozzle positioned in the upper part of a drying chamber. Next, bringing the droplets into contact with a stream of air heated to 300° C. leads to evaporation of the water and gradual drying, which makes it possible to result in solid spherical particles collected at the bottom of the drying chamber, and having a size of between 30 µm and 200 µm.

These dry particles form a powder, which is then calcined for 4 hours in a muffle furnace at a temperature of 700° C., and then which is screened between 125 µm and 200 µm to remove the finest particles.

The particles obtained form the final oxide support, and this final oxide material is made up of 87.1% by weight of alumina ($Al_2O_3$) and of 12.9% by weight of silica ($SiO_2$).

The particle size distribution of the final oxide support indicates $D_{v10}$=10 µm, $D_{v50}$=104 µm and $D_{v90}$=237 µm. The pore volume measured by mercury porosimetry of the alumina support is 0.94 ml/g, and a bimodal pore size distribution is observed. The pore size distribution for the mesoporosity is between 4 and 50 nm (centered on 9.8 nm) and for the macroporosity is between 50 and 1000 nm (centered on 426 nm). The macropore volume is 0.51 ml/g, i.e. 54% of the total pore volume measured by mercury porosimetry.

120 g of this siliceous alumina were impregnated according to the dry impregnation method with 52 g of copper nitrate trihydrate dissolved in the necessary volume of demineralized water. After drying at 120° C. and calcining at 800° C. for 12 h, a solid containing 12.4% by weight of CuO equivalent is obtained.

After calcining at 800° C. for 12 h, x-ray diffraction shows that a copper aluminate ($CuAl_2O_4$) substoichiometric in Cu is formed. An amorphous band between 17 and 28° 2θ corresponding to non-crystalline silica is also present.

Figure 4A:
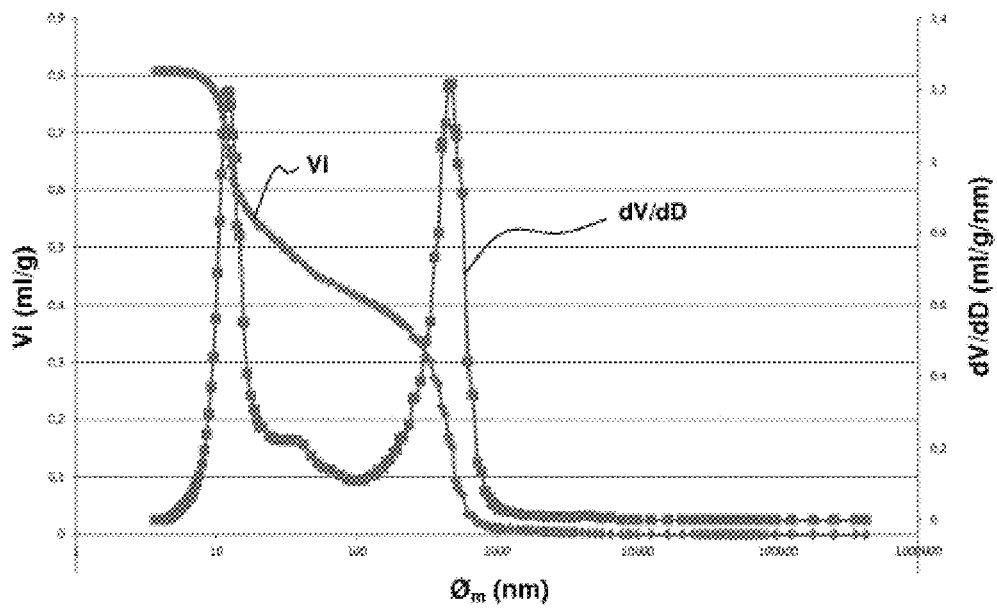
FIGS. 4A, 4B, 4C, 4D and 4E relate to an oxygen carrier solid according to example 4 (example in accordance with the invention).

The particle size distribution indicates $Dv_{10}$=13 µm, $Dv_{50}$=120 µm and $Dv_{90}$=233 µm. The pore volume measured by mercury porosimetry of the oxygen carrier solid is 0.808 ml/g, and a bimodal pore size distribution is observed. The total pore volume consists, for 57%, of mesopores having a size between 7 and 50 nm, and, for 43%, of macropores having a size between 50 nm and 900 nm, centered on 430 nm. This distribution is visible in FIG. 4A, where Vi refers to the porosity of the particles of the initial oxygen carrier (before aging test). The grain density of the oxygen carrier solid is 880 kg/m³.

Figure 4B:
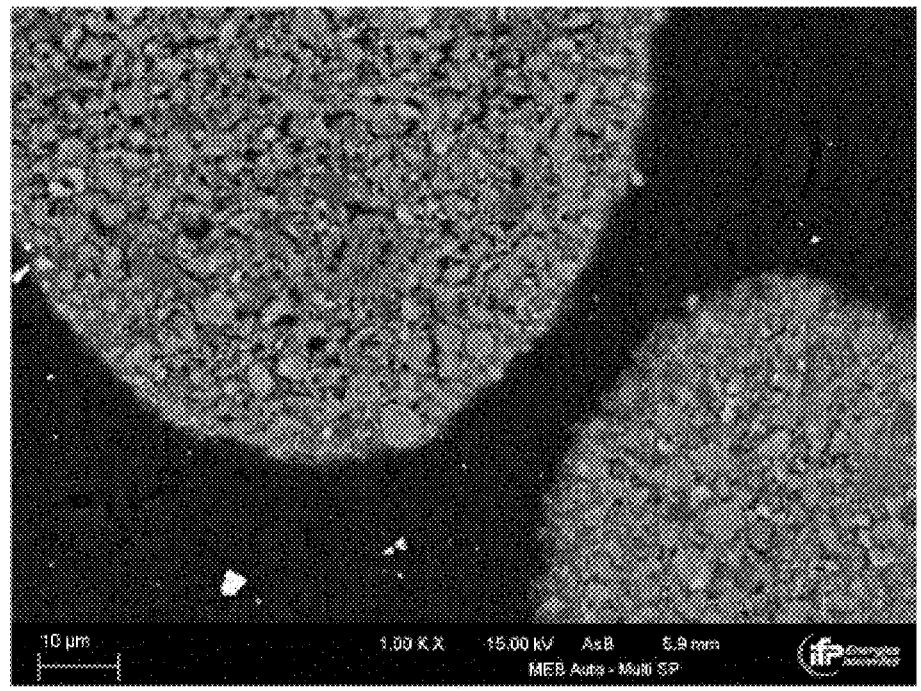

The SEM image of FIG. 4B on a polished section shows a substantially spherical oxygen carrier particle. The small difference in contrast in backscattered electrons between the constituent grains of the oxygen carriers indicates that the copper is dispersed homogeneously within the particle.

The aging of the particles in a batch fluidized bed was carried out according to the same protocol as in example 1.

Figure 4C:
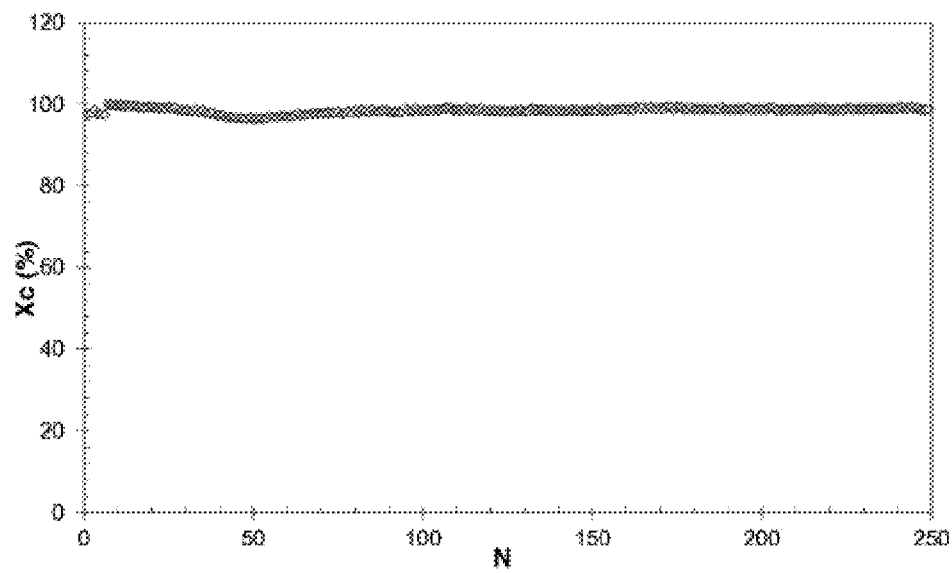

The conversion of methane into $H_2O$ and $CO_2$, visible in the graph of FIG. 4C displaying the (normalized) conversion of the methane as a function of the redox cycles during the test, is stable, of the order of 99% over the entire test.

It should be noted that the nature of the active mass used (CuO) leads to the appearance of oxygen during the nitrogen purge step. The particles may therefore be used either in a CLC or CLOU process.

As in example 4, the particle size distribution after the aging test is similar to that of the material before testing.

The main crystalline phases detected by XRD after aging are tenorite (CuO), copper aluminate ($CuAl_2O_4$), mullite ($Al_6Si_2O_{13}$), delta-alumina and alpha-alumina.

Figure 4D:
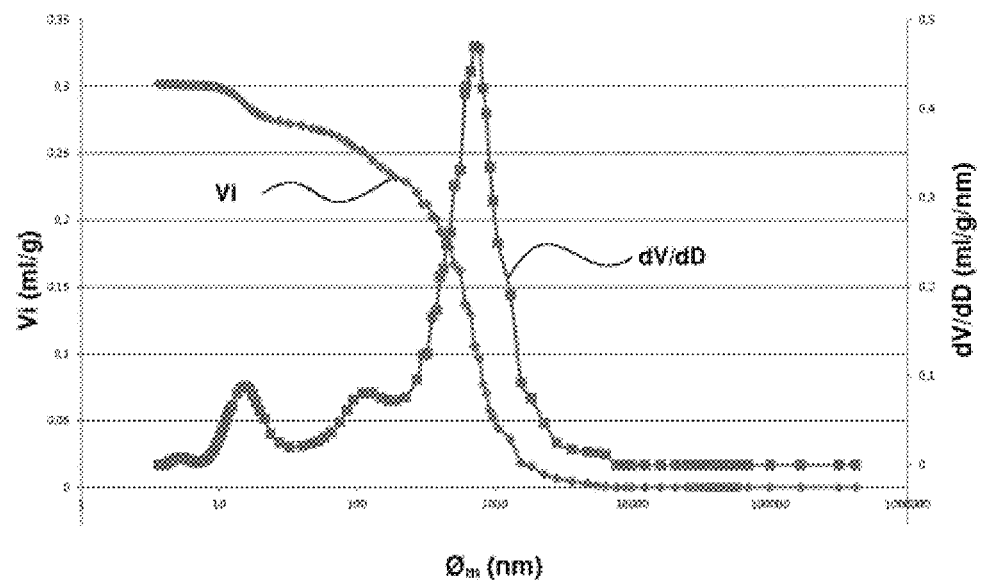
Figure 4E:
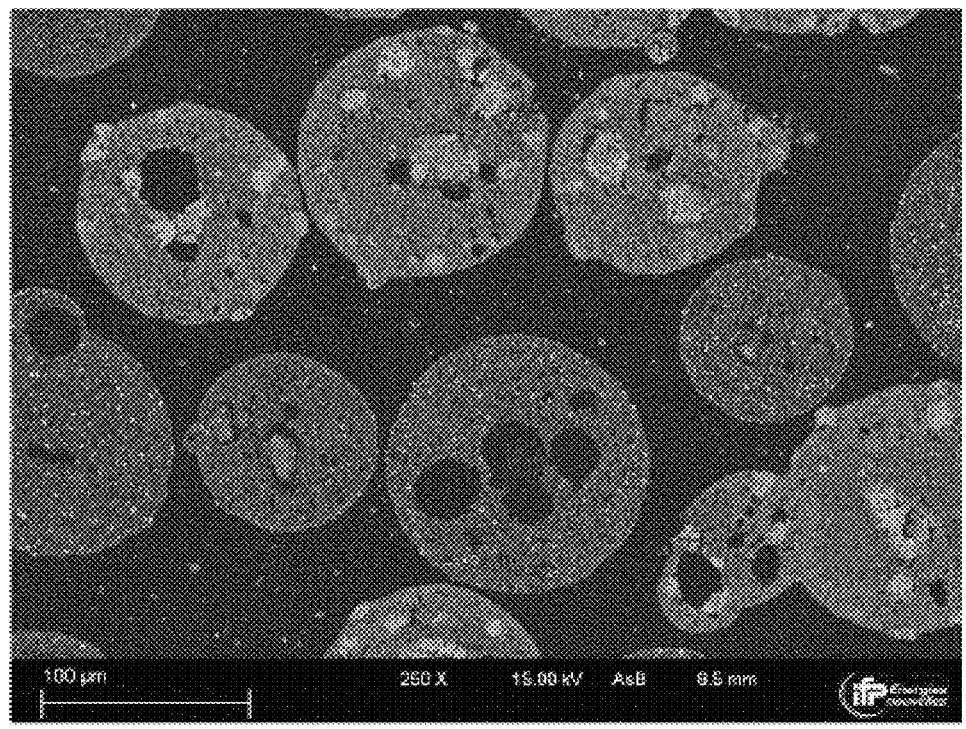

The distribution of the copper, after 250 cycles in a batch fluidized bed, within the particles of the oxygen carrier solid according to the invention remains relatively homogeneous, with a markedly minimized tendency for copper to migrate to the periphery of the particles compared to example 3. Observed, for example on the SEM image of FIG. 4E of a polished section of particles of the oxygen carrier solid after testing, is the presence of cuprous nodules having a size between 0.1 µm and 5 µm distributed uniformly in the macroporosity, and also broad zones having an excess concentration of copper (in light gray, probably $CuAl_2O_4$).

The total pore volume of the particles measured by mercury porosimetry (0.302 ml/g) has greatly reduced, and consists essentially of macroporosity (0.267 ml/g). The presence of silicon within the aluminous matrix results in behavior different from that of pure alumina during the redox cycles. A greater densification of the ceramic matrix is observed.

The residual mesopore volume represents only 11% of the total pore volume and is probably linked to the presence of $CuAl_2O_4$ and/or delta-alumina. The macropore volume decreased relatively little compared to the initial state.

The size of the pores after 250 cycles varies between 50 nm and 2.8 µm, and is centered on 780 nm. The alumina-silica matrix sintered, but the pore size distribution and the pore volume limit the migration of the copper within the particles. This distribution is visible in FIG. 4D, where Vi refers to the porosity of the particles of the oxygen carrier after the aging test.

The morphological evolution of the oxygen carrier solid according to the invention (porosity and distribution of the copper) therefore makes it possible to envisage the prolonged use of these particles in an industrial chemical looping redox process, in particular in a circulating fluidized bed.

The invention claimed is:

1. An oxygen carrier solid in the form of particles for a process for chemical looping redox combustion of a hydrocarbon feedstock, comprising:
    a redox active mass constituting between 5% and 75% by weight of the oxygen carrier solid, the redox active mass comprising at least one copper oxide and being capable of transporting oxygen in the chemical looping redox combustion process;
    a ceramic matrix within which the redox active mass is dispersed, the ceramic matrix constituting between 25% and 95% by weight of the oxygen carrier solid, the ceramic matrix comprising 100% by weight of at least one oxide having a melting point above 1500° C.;
    a porosity such that:
        the total pore volume of the oxygen carrier solid, measured by mercury porosimetry, is between 0.05 and 1.2 ml/g,
        the pore volume of macropores constitutes at least 40% of the total pore volume of the oxygen carrier solid;
        the size distribution of the macropores within the oxygen carrier solid, measured by mercury porosimetry, is between 50 nm and 7 µm.

2. The oxygen carrier solid as claimed in claim 1, wherein the total pore volume of the oxygen carrier solid is between 0.1 and 0.85 ml/g.

3. The oxygen carrier solid as claimed in claim 1, wherein the size distribution of the macropores within the oxygen carrier solid is between 50 nm and 3 µm.

4. The oxygen carrier solid as claimed in claim 1, wherein the at least one oxide of the ceramic matrix has a melting point above 1700° C.

5. The oxygen carrier solid as claimed in claim 1, wherein the at least one oxide of the ceramic matrix comprises at least one selected from the group consisting of calcium aluminate of formula $CaAl_2O_4$, silica of formula $SiO_2$, titanium dioxide of formula $TiO_2$, perovskite of formula $CaTiO_3$, alumina of formula $Al_2O_3$, zirconia of formula $ZrO_2$, yttrium dioxide of formula $Y_2O_3$, barium zirconate of formula $BaZrO_3$, magnesium aluminate of formula $MgAl_2O_4$, magnesium silicate of formula $MgSi_2O_4$ and lanthanum oxide of formula $La_2O_3$.

6. The oxygen carrier solid as claimed in claim 5, wherein the at least one oxide of the ceramic matrix comprises silica, alumina, or a mixture of alumina and silica.

7. The oxygen carrier solid as claimed in claim 1, wherein the particles have a particle size such that more than 90% of the particles have a size between 50 µm and 600 µm.

8. A process for preparing an oxygen carrier solid as claimed in claim 1, comprising:
(A) preparing an aqueous suspension comprising the at least one oxide having a melting point above 1500° C. as a precursor of the ceramic matrix, the at least one oxide forming grains having a size between 0.1 µm and 20 µm;
(B) spray drying the suspension obtained in (A) in order to form particles, the spray drying comprising spraying the suspension in a drying chamber in order to form droplets, and simultaneously bringing the droplets into contact with a hot carrier gas brought to a temperature between 200° C. and 350° C.;
(C) calcining the particles from the spray drying in (B), the calcining being carried out in air and at a temperature between 400° C. and 1400° C.;
(D) optional screening of the calcined particles from (C), by separation using a cyclone;
(E) integrating a redox active mass according to e1) or e2) in order to produce the oxygen carrier solid in the form of particles:
e1) (i) impregnating the particles from (C) with a precursor compound of a redox active mass, then (ii) drying the impregnated particles followed (iii) by a calcination;
e2) incorporating the redox active mass during the preparation of the suspension in (A).

9. The process for preparing an oxygen carrier solid as claimed in claim 8, wherein e1) comprises:
(i) impregnating the particles from (C) with an aqueous or organic solution containing at least one soluble precursor compound of copper.

10. The process for preparing an oxygen carrier solid as claimed claim 9, wherein the impregnation (i) in e1) is carried out in one or more successive steps.

11. The process for preparing an oxygen carrier solid as claimed in claim 8, wherein the drying (ii) in e1) is carried out in air or in a controlled atmosphere, at a temperature between 30° C. and 200° C.

12. The process for preparing an oxygen carrier solid as claimed in claim 8, wherein the calcining (iii) in e1) is carried out in air at a calcining temperature between 450° C. and 1400° C., and is carried out for a period of 1 to 24 hours.

13. The process for preparing an oxygen carrier solid as claimed in claim 8, wherein e2) comprises (j) impregnating the grains of the at least one oxide as the precursor of the ceramic matrix with an aqueous or organic solution containing at least one soluble precursor compound of copper, the impregnation being carried out before the grains are suspended.

14. The process for preparing an oxygen carrier solid as claimed in claim 8, wherein e2) comprises (jj) adding at least one precursor of the redox active mass to the suspension prepared in (A), the at least one precursor of the redox active mass being a soluble compound of copper.

15. The process for preparing an oxygen carrier solid as claimed in claim 8, wherein e2) comprises (jjj) adding, to the suspension prepared in (A), grains of at least one copper oxide, the grains having a size between 0.1 µm and 20 µm in order to form the redox active mass of the oxygen carrier solid.

16. The process for preparing an oxygen carrier solid as claimed in claim 8, wherein, in A), at least one binder is added to the aqueous suspension, the binder being an organic binder or in inorganic binder.

17. The process for preparing an oxygen carrier solid as claimed in claim 8, wherein, in (A), at least one pore-forming agent is added to the aqueous suspension.

18. The process for preparing an oxygen carrier solid as claimed in claim 8, wherein fines of the oxygen carrier solid that are produced during the use of the oxygen carrier solid in a process for chemical looping redox combustion of a hydrocarbon feedstock are recycled to (E).

19. A process for chemical looping redox combustion of a hydrocarbon feedstock using an oxygen carrier solid as claimed in claim 1.

20. The process for chemical looping redox combustion of a hydrocarbon feedstock as claimed in claim 19, wherein the oxygen carrier solid circulates between at least one reduction zone and an oxidation zone both operating in a fluidized bed, the temperature in the at least one reduction zone and in the oxidation zone being between 400° C. and 1400° C.

21. A process for chemical looping redox combustion of a hydrocarbon feedstock comprising contacting the feedstock with the oxygen carrier solid prepared according to the process as claimed in claim 8.

22. The oxygen carrier solid as claimed in claim 1, wherein the at least one oxide of the ceramic matrix has a melting point above 2000° C.

23. The oxygen carrier solid as claimed in claim 5, wherein the at least one oxide of the ceramic matrix comprises alumina.

* * * * *